(12) United States Patent
Wee et al.

(10) Patent No.: US 11,019,658 B2
(45) Date of Patent: May 25, 2021

(54) WIRELESS COMMUNICATION DEVICE AND WIRELESS COMMUNICATION METHOD

(71) Applicant: Panasonic Intellectual Property Corporation of America, Torrance, CA (US)

(72) Inventors: Yao Huang Gaius Wee, Singapore (SG); Hiroyuki Motozuka, Kanagawa (JP); Masataka Irie, Kanagawa (JP); Takenori Sakamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/443,892

(22) Filed: Jun. 18, 2019

(65) Prior Publication Data

US 2019/0306882 A1    Oct. 3, 2019

Related U.S. Application Data

(63) Continuation of application No. PCT/JP2017/043407, filed on Dec. 4, 2017.

(60) Provisional application No. 62/446,264, filed on Jan. 13, 2017.

(30) Foreign Application Priority Data

Nov. 24, 2017   (JP) .............................. JP2017-226198

(51) Int. Cl.
*H04W 74/08*   (2009.01)
*H04W 72/04*   (2009.01)

(52) U.S. Cl.
CPC ... *H04W 74/0808* (2013.01); *H04W 72/0406* (2013.01)

(58) Field of Classification Search
CPC .................................................. H04W 74/0808
See application file for complete search history.

(56) References Cited

U.S. PATENT DOCUMENTS

| 2011/0287796 A1* | 11/2011 | Jain ...................... H04B 7/0695 |
| | | 455/509 |
| 2012/0082040 A1* | 4/2012 | Gong ................ H04W 74/0816 |
| | | 370/252 |
| 2013/0229307 A1 | 9/2013 | Chang et al. |

(Continued)

OTHER PUBLICATIONS

International Search Report of PCT application No. PCT/JP2017/043407 dated Feb. 20, 2018.

(Continued)

*Primary Examiner* — John D Blanton
(74) *Attorney, Agent, or Firm* — Seed IP Law Group LLP

(57) ABSTRACT

A wireless communication device performs first carrier sensing, regarding part of multiple channels that are candidates for receiving a first signal before reception of the first signal. After having received the first signal, the wireless communication device performs second carrier sensing regarding one or more channels, out of the plurality of channels, that are one or more channels corresponding to the channel information included in the first signal, and where at least the first carrier sensing has not been executed, before reception of data signals by transmission of a second signal.

15 Claims, 18 Drawing Sheets

(56) References Cited

U.S. PATENT DOCUMENTS

| | | | |
|---|---|---|---|
| 2013/0343288 A1* | 12/2013 | Ratasuk | H04W 52/38 |
| | | | 370/329 |
| 2018/0007692 A1* | 1/2018 | Trainin | H04W 72/0453 |
| 2018/0270775 A1* | 9/2018 | Zhang | H04L 27/2655 |
| 2020/0067577 A1* | 2/2020 | Lou | H04W 74/002 |
| 2020/0162135 A1* | 5/2020 | Sun | H04B 17/318 |

OTHER PUBLICATIONS

IEEE Std 802.11ad(TM)-2012, IEEE Standard for Information Technology-, Telecommunications and information exchange between systems, Local and metropolitan area networks-, Specific requirements, Part 11: Wireless LAN Medium Access Control (MAC) and Physical Layer (PHY) Specifications, Amendment 3: Enhancements for Very High Throughput in the 60 GHz Band, Dec. 28, 2012.

IEEE 802.11-16/1482r1, "Carrier Sense for Multi-Channel Allocation", Nov. 9, 2016.

IEEE 802.11-16/0098r0, "Channel bonding proposals", Jan. 18, 2016.

The Extended European Search Report dated Dec. 3, 2019 for the related European Patent Application No. 17891211.9.

English Translation of Taiwan Search Report dated Jan. 4, 2021 for the related Taiwan Patent Application No. 106144427, 1 page.

* cited by examiner

FIG. 5A

| Compressed BW | OPERATION MODE | | OCCUPIED CHANNEL NOS. | FIRST CHANNEL NO. | SECOND CHANNEL NO. | ch1 | ch2 | ch3 | ch4 | ch5 | ch6 | ch7 | ch8 |
|---|---|---|---|---|---|---|---|---|---|---|---|---|---|
| 0 | 2.16 GHz SINGLE CHANNEL | (a) | 1 | 1 | - | ■ | | | | | | | |
| | | (b) | 2 | 2 | - | | ■ | | | | | | |
| | | (c) | 3 | 3 | - | | | ■ | | | | | |
| | | (d) | 4 | 4 | - | | | | ■ | | | | |
| | | (e) | 5 | 5 | - | | | | | ■ | | | |
| | | (f) | 6 | 6 | - | | | | | | ■ | | |
| | | (g) | 7 | 7 | - | | | | | | | ■ | |
| | | (h) | 8 | 8 | - | | | | | | | | ■ |
| 1 | 4.32 GHz CB | (a) | 2,3 | 10 | - | | ■ | ■ | | | | | |
| | | (b) | 4,5 | 12 | - | | | | ■ | ■ | | | |
| | | (c) | 6,7 | 14 | - | | | | | | ■ | ■ | |
| 2 | 4.32 GHz CB | (a) | 1,2 | 9 | - | ■ | ■ | | | | | | |
| | | (b) | 3,4 | 11 | - | | | ■ | ■ | | | | |
| | | (c) | 5,6 | 13 | - | | | | | ■ | ■ | | |
| | | (d) | 7,8 | 15 | - | | | | | | | ■ | ■ |
| 3 | 6.48 GHz CB | (a) | 1,2,3 | 17 | - | ■ | ■ | ■ | | | | | |
| | | (b) | 3,4,5 | 19 | - | | | ■ | ■ | ■ | | | |
| | | (c) | 5,6,7 | 21 | - | | | | | ■ | ■ | ■ | |
| 4 | 6.48 GHz CB | (a) | 2,3,4 | 18 | - | | ■ | ■ | ■ | | | | |
| | | (b) | 4,5,6 | 20 | - | | | | ■ | ■ | ■ | | |
| | | (c) | 6,7,8 | 22 | - | | | | | | ■ | ■ | ■ |
| 5 | 8.64 GHz CB | (a) | 1,2,3,4 | 25 | - | ■ | ■ | ■ | ■ | | | | |
| | | (b) | 2,3,4,5 | 29 | - | | ■ | ■ | ■ | ■ | | | |
| | | (c) | 3,4,5,6 | 26 | - | | | ■ | ■ | ■ | ■ | | |
| | | (d) | 4,5,6,7 | 27 | - | | | | ■ | ■ | ■ | ■ | |
| | | (e) | 5,6,7,8 | 28 | - | | | | | ■ | ■ | ■ | ■ |

FIG. 5B

| Compressed BW | OPERATION MODE | | OCCUPIED CHANNEL NOS. | FIRST CHANNEL NO. | SECOND CHANNEL NO. | ch1 | ch2 | ch3 | ch4 | ch5 | ch6 | ch7 | ch8 |
|---|---|---|---|---|---|---|---|---|---|---|---|---|---|
| 6 | 2.16 + 2.16 GHz CA | (a) | 1,3 | 1 | 3 | | | | | | | | |
| | | (b) | 2,4 | 2 | 4 | | | | | | | | |
| | | (c) | 3,5 | 3 | 5 | | | | | | | | |
| | | (d) | 4,6 | 4 | 6 | | | | | | | | |
| | | (e) | 5,7 | 5 | 7 | | | | | | | | |
| | | (f) | 6,8 | 6 | 8 | | | | | | | | |
| 7 | 2.16 + 2.16 GHz CA | (a) | 1,4 | 1 | 4 | | | | | | | | |
| | | (b) | 2,5 | 2 | 5 | | | | | | | | |
| | | (c) | 3,6 | 3 | 6 | | | | | | | | |
| | | (d) | 4,7 | 4 | 7 | | | | | | | | |
| | | (e) | 5,8 | 5 | 8 | | | | | | | | |
| 8 | 2.16 + 2.16 GHz CA | (a) | 1,5 | 1 | 5 | | | | | | | | |
| | | (b) | 2,6 | 2 | 6 | | | | | | | | |
| | | (c) | 3,7 | 3 | 7 | | | | | | | | |
| | | (d) | 4,8 | 4 | 8 | | | | | | | | |
| | | (e) | 1,6 | 1 | 6 | | | | | | | | |
| | | (f) | 2,7 | 2 | 7 | | | | | | | | |
| | | (g) | 3,8 | 3 | 8 | | | | | | | | |
| | | (h) | 1,7 | 1 | 7 | | | | | | | | |
| | | (i) | 2,8 | 2 | 8 | | | | | | | | |
| | | (j) | 1,8 | 1 | 8 | | | | | | | | |
| 9 | 2.16 + 2.16 GHz CA | (a) | 1,2 | 1 | 2 | | | | | | | | |
| | | (b) | 2,3 | 2 | 3 | | | | | | | | |
| | | (c) | 3,4 | 3 | 4 | | | | | | | | |
| | | (d) | 4,5 | 4 | 5 | | | | | | | | |
| | | (e) | 5,6 | 5 | 6 | | | | | | | | |
| | | (f) | 6,7 | 6 | 7 | | | | | | | | |
| | | (g) | 7,8 | 7 | 8 | | | | | | | | |

FIG. 5C

| Compressed BW | OPERATION MODE | | OCCUPIED CHANNEL NOS. | FIRST CHANNEL NO. | SECOND CHANNEL NO. | ch1 | ch2 | ch3 | ch4 | ch5 | ch6 | ch7 | ch8 |
|---|---|---|---|---|---|---|---|---|---|---|---|---|---|
| 10 | 4.32+4.32 GHz CA | (a) | 1,2,3,4 | 9 | 11 | ■ | ■ | ■ | ■ | | | | |
| | | (b) | 2,3,4,5 | 10 | 12 | | ■ | ■ | ■ | ■ | | | |
| | | (c) | 3,4,5,6 | 11 | 13 | | | ■ | ■ | ■ | ■ | | |
| | | (d) | 4,5,6,7 | 12 | 14 | | | | ■ | ■ | ■ | ■ | |
| | | (e) | 5,6,7,8 | 13 | 15 | | | | | ■ | ■ | ■ | ■ |
| | | (f) | 1,2,4,5 | 9 | 12 | ■ | ■ | | ■ | ■ | | | |
| | | (g) | 1,2,5,6 | 9 | 13 | ■ | ■ | | | ■ | ■ | | |
| | | (h) | 1,2,6,7 | 9 | 14 | ■ | ■ | | | | ■ | ■ | |
| | | (i) | 1,2,7,8 | 9 | 15 | ■ | ■ | | | | | ■ | ■ |
| | | (j) | 2,3,5,6 | 10 | 13 | | ■ | ■ | | ■ | ■ | | |
| | | (k) | 2,3,6,7 | 10 | 14 | | ■ | ■ | | | ■ | ■ | |
| | | (l) | 2,3,7,8 | 10 | 15 | | ■ | ■ | | | | ■ | ■ |
| | | (m) | 3,4,6,7 | 11 | 14 | | | ■ | ■ | | ■ | ■ | |
| | | (n) | 3,4,7,8 | 11 | 15 | | | ■ | ■ | | | ■ | ■ |
| | | (o) | 4,5,7,8 | 12 | 15 | | | | ■ | ■ | | ■ | ■ |
| 11-15 | reserved | - | | | | | | | | | | | |

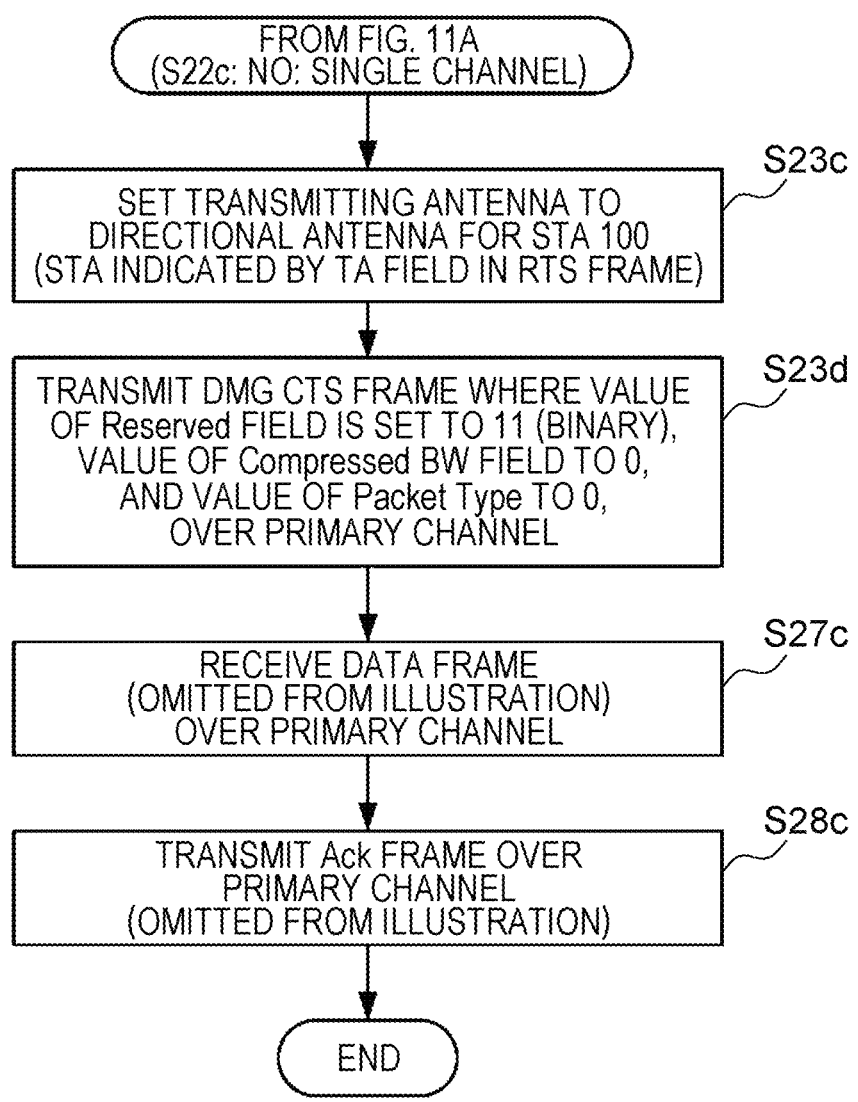

WIRELESS COMMUNICATION DEVICE AND WIRELESS COMMUNICATION METHOD

BACKGROUND

1. Technical Field

The present disclosure relates to a wireless communication device and a wireless communication method.

2. Description of the Related Art

IEEE 802.11 is one of standards related to wireless local area network (LAN), with the IEEE 802.11ad standard and IEEE 802.11ay standard, for example, being included therein (e.g., see IEEE 802.11ad-2012 and IEEE 802.11-16/1482r01 Carrier Sense for Multi-Channel Allocation, (online), November 2016, (searched Nov. 17, 2017), Internet <URL:https://mentor.ieee.org/802.11/dcn/16/11-16-1482-01-00ay-carrier-sense-for-multi-channel-allocation.pptx>). Note that "IEEE" is short for "Institute of Electrical and Electronics Engineers". Hereinafter, the "IEEE 802.11ad standard" may be abbreviated to "11 ad standard", and the "IEEE 802.11 ay standard" may be abbreviated to "11 ay standard".

SUMMARY

Using a communication technology called "channel bonding", where data communication is performed by aggregating multiple channels, is being studied for wireless LAN. In "channel bonding", carrier sensing is performed regarding each of multiple channels before starting data communication, to confirm whether or not each channel is being used. However, performing carrier sensing regarding all of multiple channels leads to increased electric power consumption of the wireless communication device.

One non-limiting and exemplary embodiment provides a wireless communication device and wireless communication method, whereby electric power consumption due to carrier sensing of multiple channels can be reduced.

In one general aspect, the techniques disclosed here feature a wireless communication device including: a reception circuit that receives a first signal requesting a transmission permission for data signals and including channel information used for data transmission; a transmission circuit that transmits a second signal to a transmission source of the first signal, in a case of permitting transmission of the data signals with regard to reception of the first signal; and a control circuit that outputs a first control signal to the reception circuit in order to execute first carrier sensing regarding part of a plurality of channels that are candidates for reception of the first signals, before reception of the first signals, and after having received the first signals, outputs a second control signal to the reception circuit in order to execute second carrier sensing regarding one or more channels, out of the plurality of channels, that are one or more channels corresponding to the channel information included in the first signal, and where at least the first carrier sensing has not been executed, before reception of the data signals by transmission of the second signal.

According to an aspect of the present disclosure, electric power consumption due to carrier sensing by a wireless communication device can be reduced.

It should be noted that these general or specific embodiments may be implemented as a system, a device, a method, an integrated circuit, a computer program, or a recording medium, and may be realized by any combination of a system, device, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5A is a diagram illustrating an example of values of a compressed bandwidth (BW) field in FIG. 4;

FIG. 5B is a diagram illustrating an example of values of a compressed BW field in FIG. 4;

FIG. 5C is a diagram illustrating an example of values of a compressed BW field in FIG. 4;

FIG. 11C is a flowchart illustrating an operation example of a STA according to the second embodiment.

DETAILED DESCRIPTION

Embodiments of the present disclosure will be described in detail below, with reference to the drawings as appropriate. Note however, that unnecessarily detailed description may be omitted. For example, detailed description of well-known items, or repetitive description of configurations that are substantially the same, may be omitted. This is to keep the following description from becoming redundant, and to facilitate understanding of those skilled in the art.

Note that the attached drawings and the following description have been provided for sufficient understanding of the present disclosure by those skilled in the art, and that these are not intended to restrict the subject matter of the Claims.

System Configuration

Figure 1:
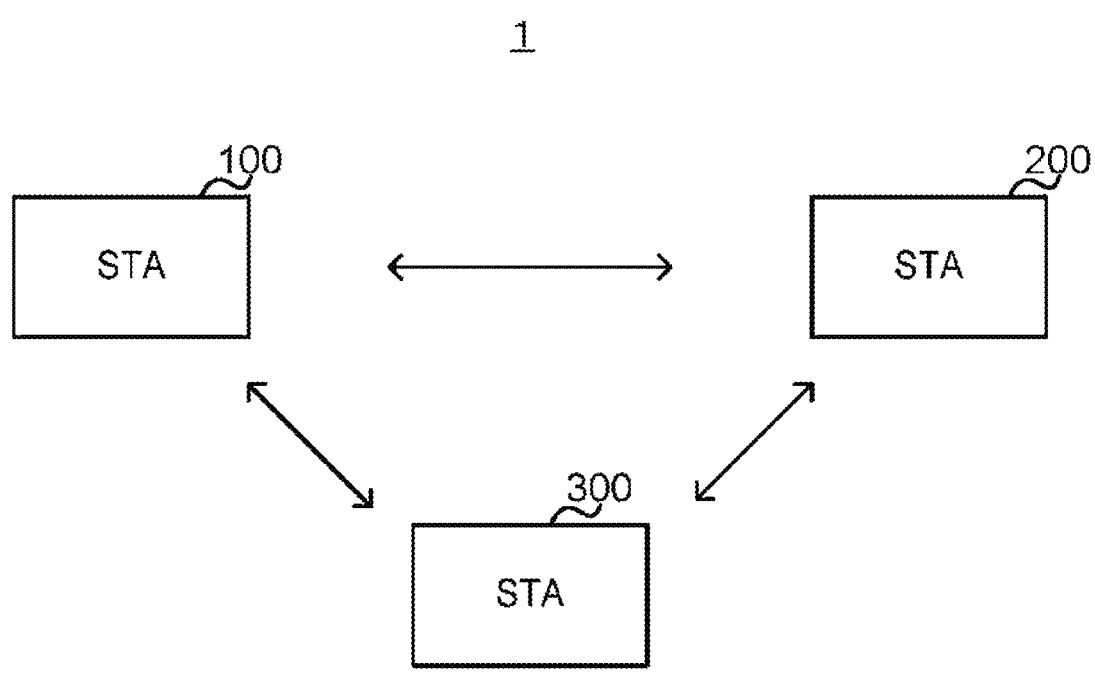
FIG. 1 is a block diagram illustrating a configuration example of a wireless communication system according to an embodiment.

FIG. 1 is a block diagram illustrating a configuration example of a wireless communication system according to an embodiment. A wireless communication system 1 may exemplarily have multiple communication devices (STA) 100, 200, and 300, as illustrated in FIG. 1.

The STA 100, STA 200, and STA 300 wirelessly communicate with each other following a wireless LAN related standard, such as the 11ad standard or the 11ay standard, for example. Although three STAs are illustrated in FIG. 1, the number of STAs may be two or may be four or more in the wireless communication system 1. The term "wireless LAN related standard" may include, in addition to the above-described 11ad standard and 11 ay standard for example, all or part of standards that have been standardized or regarding which standardization is being discussed by the IEEE 802.11 task group.

"STA" is short for "station", which is equipment that suppers wireless communication. For example, the term "STA" may include wireless transmission/reception units (WTRU), user equipment (UE), mobile stations, fixed or mobile subscriber units, access points (AP), and computers. The term "AP" may include wireless base stations (e.g., node B or BTS) and controllers.

While any two of the STA 100, STA 200, and STA 300 in FIG. 1 are communicating, the other STA does not perform transmission, as to not interfere with the STAs that are communicating. For example, while the STA 100 and STA 200 are communicating, the STA 300 does not transmit, thereby avoiding interference with the communication between the STA 100 and STA 200. For example, the 11ad standard stipulates a request to send (RTS) frame and a directional multi-gigabit clear to send (DMG CTS) frame. The STA 100 transmits an RTS frame to suppress transmission by the STA 300 while the STA 100 and STA 200 are communicating with each other, and thus can avoid interference from signals transmitted by the STA 300. Also, the 11 ay standard stipulates transmitting RTS frames and DMG CTS frames over each of multiple channels, to perform channel bonding communication using multiple channels.

Note that "frame" and "signals" may be used interchangeably. "RTS frame" and "DMG CTS frame" are each an example of "control frame" or "control signals". A control frame or control signals may be referred to as "control message". "RTS frame" is an example of a first signal requesting a communication partner (transmission destination STA) for permission to transmit a data frame. "DMG CTS frame" is an example of a second signal transmitted by a STA that has received an RTS frame, to permit a communication partner (transmission source STA) to transmit a data frame. The "DMG CTS frame" may be understood to be equivalent to "response signals" as to the "RTS frame". A "DMG CTS frame" may be a CTS frame that is not DMG-based. Hereinafter both will be collectively referred to as "CTS frame".

A "STA" performs sensing of a usage (or occupation) state of a wireless channel during a predetermined time (or period or interval), to reduce the probability of collision with frames being transmitted or received by other STAs, before attempting frame transmission. Sensing may be referred to as "carrier sense (CS)" or "clear channel assessment (CCA)".

In a case where a wireless channel (hereinafter shortened to simply "channel") is in an available state (idle state) as a result of carrier sensing or CCA, the "STA" starts transmission of a frame. On the other hand, in a case where a channel is in a busy state that is an occupied state or in-use state, the "STA" may, instead of starting transmission of a frame, wait for a predetermined amount of time referred to as "backoff time" for example, and thereafter transmit the frame. The probability of interframe collision occurring can be reduced by setting different backoff times amount STAs. Note that "backoff time" is also referred to as "contention window".

Carrier sensing or CCA may be performed in an interframe space (IFS). "IFS" may be either of later-described short interframe space (SIFS) and point coordination function interframe space (PIFS), or may be another time decided beforehand.

Data Communication Example

Next, an example of a method of the STA 100 performing data communication with the STA 200 will be described with reference to FIG. 2.

Step S1

The STA 100, STA 200, and STA 300 perform carrier sensing on multiple channels (e.g., ch1, ch2, and ch3). "Carrier sensing" may include, for example, measuring whether or not reception power of a threshold value or more has been detected. Detecting reception power of a threshold value or more may be referred to as "power detection" or "energy detection (ED)".

Figure 2:
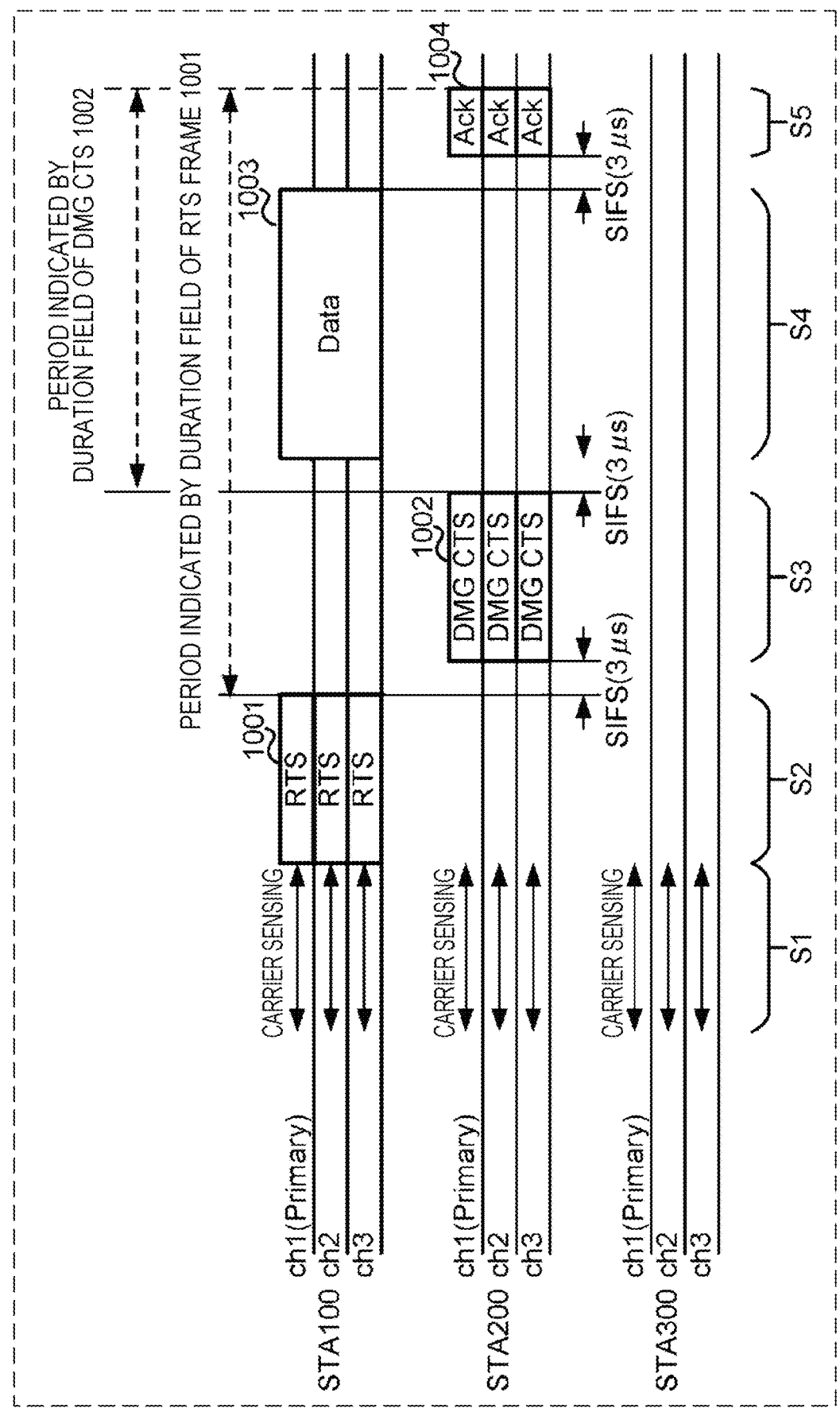
FIG. 2 is a diagram illustrating an example of data communication of a wireless communication system as a comparative example to FIG. 3.

The STA 100, STA 200, and STA 300 may, before starting data communication using the procedures illustrated in FIG. 2, for example, transmit an association response frame stipulated in the 11ad standard with information regarding usable channels (operating channels) to each other, and decide a channel for performing carrier sensing. For example, in a case of communicating with the STA 200, the STA 100 performs carrier sensing on a usable channel included in the association response frame transmitted by the STA 200.

The STA 100, STA 200, and STA 300 may also, before starting data communication using the procedures illustrated in FIG. 2, for example, each perform beamforming training (omitted from illustration) and decide an antenna directionality pattern suitable for data communication (referred to as best sector). The STA 100, STA 200, and STA 300 setting the antenna arrays to the best sector is equivalent to controlling the antenna directionality toward the STA that is the communication partner.

Note that "usable channel" may also be referred to as "operating channel". The "operating channel" may be decided beforehand (e.g., before transmission of the RTS frame) between the STA 100 and STA 200. For example, each STA may include information of usable channels in beacon frames or association request frames and transmit, with both STAs 100 and 200 deciding usable channels to be operating channels.

Also, "carrier sensing" may include measuring whether or not a preamble pattern stipulated in the 11ad standard or the 11 ay standard has been detected, for example. Preamble pattern may be shortened to "preamble", and detection of a preamble pattern may be shortened to "preamble detection" (PD).

In a case where reception power of a threshold value or higher, or a preamble pattern, has been detected at a certain channel, the STA 100, STA 200, and STA 300 detect a clear channel assessment (CCA) busy, and judge that the channel is being used. A state where no CCA busy is detected may be referred to as "CCA idle".

Step S2

For example, in a case where the STA 100 does not detect a CCA busy at any channel in carrier sensing of channels ch1, ch2, and ch3, the STA 100 transmits an RTS frame 1001 to the STA 200 over channels ch1, ch2, and ch3. For example, the STA 100 duplicates the RTS frame 1001, and transmits the RTS frame 1001 over each of the channels ch1, ch2, and ch3.

The STA 100 sets the time it will take for performing data communication with the STA 200, for example, in a duration field of the RTS frame 1001. For example, the duration field may include one or more of (1) time it will take to transmit CTS frame 1002 (later-described step S3), (2) time it will take for the STA 100 to transmit data frame 1003 (later-described step S4), and (3) time it will take for the STA 200 to transmit Ack frame 1004 (later-described step S5).

Step S3

The STA 200 receives the RTS frame 1001 over one or more channel of the channels ch1, ch2, and ch3. In a case of not detecting a CCA busy on the channels ch1, ch2, and ch3 during a predetermined period (e.g., a PIFS omitted from illustration) immediately before receiving the RTS frame 1001, the STA 200 transmits the CTS frame 1002 to each of the channels ch1, ch2, and ch3. "P IFS" is defined as 8 µs in the 11ad standard, for example. The CTS frame 1002 is transmitted after SIFS after receiving the RTS frame 1001. "SIFS" is defined as 3 µs in the 11ad standard, for example.

Step S4

After having received the CTS frame 1002, the STA 100 transmits the data frame 1003 to the STA 200 by channel bonding over the channels ch1, ch2, and ch3. The data frame 1003 is transmitted after SIFS, for example, after having received the CTS frame 1002.

Step S5

In a case of having received the data frame 1003, the STA 200 transmits the Ack frame 1004 or a Block Ack frame that is omitted from illustration, addressed to STA 100, over the channels ch1, ch2, and ch3. The Ack frame 1004 and Block Ack frame are transmitted after SIFS, for example, after having received the data frame 1003.

Note that the Ack frame is an example of signals making notification to the effect that the data frame 1003 has been correctly received or decoded. The Block Ack frame is an example of signals making notification to the effect that, in a case where multiple data blocks are included in the data frame 1003, e.g., in a case where the data frame 1003 is an aggregate MAC protocol data unit (A-MPDU) or aggregate MAC data frame, each data block has been correctly received or decoded. The Block Ack frame is used to request retransmission of a portion (data block) where an error has occurred in the data frame, for example. The Ack frame 1004 and Block Ack frame may be collectively referred to as "transmission confirmation signals".

Note that the STA 100 may repeat step S4 and step S5 during a period that the duration field of the RTS frame 1001 indicates, and transmit multiple data frames 1003. The period that the duration field of the RTS frame 1001 transmitted by the STA 100 indicates is equivalent to the transmission opportunity (TXOP or TX opportunity) of the STA 100.

In a case of having received the RTS frame 1001 that the STA 100 has transmitted in step S2, the STA 300 does not perform transmission using channels ch1, ch2, and ch3 during the TXOP of the STA 100. Accordingly, the STA 300 can avoid interfering with the communication between the STA 100 and STA 200.

Also, the STA 200 may set the remaining time of the TXOP of the STA 100 in the duration field of the CTS frame 1002 in step S3. In a case of having received the CTS frame 1002, the STA 300 can tell the remaining time of the TXOP of the STA 100, and does not perform transmission during the remaining time of the TXOP of the STA 100. Accordingly, the STA 300 can avoid interfering with the communication between the STA 100 and STA 200.

Now, the timing of receiving an RTS frame 1001 from the STA 100 and STA 300 is unknown in FIG. 2, so the STA 200 continuously performs carrier sensing in step S1 regarding the multiple channels ch1, ch2, and ch3 in standby state. Accordingly, the amount of electric power consumption of the STA 200 is great as compared to a case of performing carrier sensing regarding a single channel.

First Embodiment

In a first embodiment, channels for performing carrier sensing are set to part of the multiple channels, thereby reducing electric power consumption of the STAs in standby state. For example, in FIG. 3, the STA 200 (and STA 300) perform carrier sensing regarding a primary channel (ch1 in the example in FIG. 3), and do not perform carrier sensing regarding the remaining channels ch2 and ch3. Accordingly, electric power consumption of the STA 200 (and STA 300) in standby state can be reduced. Note that in the drawings, the primary channel may be abbreviated to "P channel". One or more channels that are not the P channel may be referred to as "secondary channel (S channel)".

A data communication example of the wireless communication system 1 according to the first embodiment will be described with reference to FIG. 3. Note that in FIG. 3, the same frames as those exemplified in FIG. 2 are denoted by the same reference numerals in FIG. 3.

Step S11

The STA 100 that transmits data communication performs carrier sensing of multiple channels ch1, ch2, and ch3 that are used for transmitting data frames, for example. On the other hand, the STA 200 (and STA 300) in standby state perform carrier sensing regarding part of the multiple channels ch1, ch2, and ch3 (e.g., regarding the primary channel ch1) and do not perform carrier sensing regarding the remaining channels ch2 and ch3. Note that the multiple channels ch1, ch2, and ch3 are equivalent to candidate channels where RTS frames are received at the STA 200.

Step S12

In a case where no CCA busy has been detected for any of the channels ch1, ch2, and ch3 in the carrier sensing in step S11, the STA 100 transmits an RTS frame 2001 addressed to the STA 200, over each of the channels ch1, ch2, and ch3. The STA 200 receives the RTS frame 2001 over one or more channels of the multiple channels ch1, ch2, and ch3.

Step S13

In a case where the STA 200 had not been performing carrier sensing regarding a channel over which the RTS frame 2001 was received (e.g., at least one of ch1, ch2, and ch3), carrier sensing may be performed regarding all channels (ch1, ch2, and ch3) over which the RTS frame 2001 was received, for example. The time for performing carrier sensing in step S13 may be at least PIFS, for example. "PIFS" is, for example, 8 µs. Now, since carrier sensing is performed regarding all of the multiple channels ch1, ch2, and ch3 in step S1 in the example in FIG. 2, the CTS frame 1002 is transmitted after SIFS after having received the RTS frame 1001 (step S3).

Figure 3:
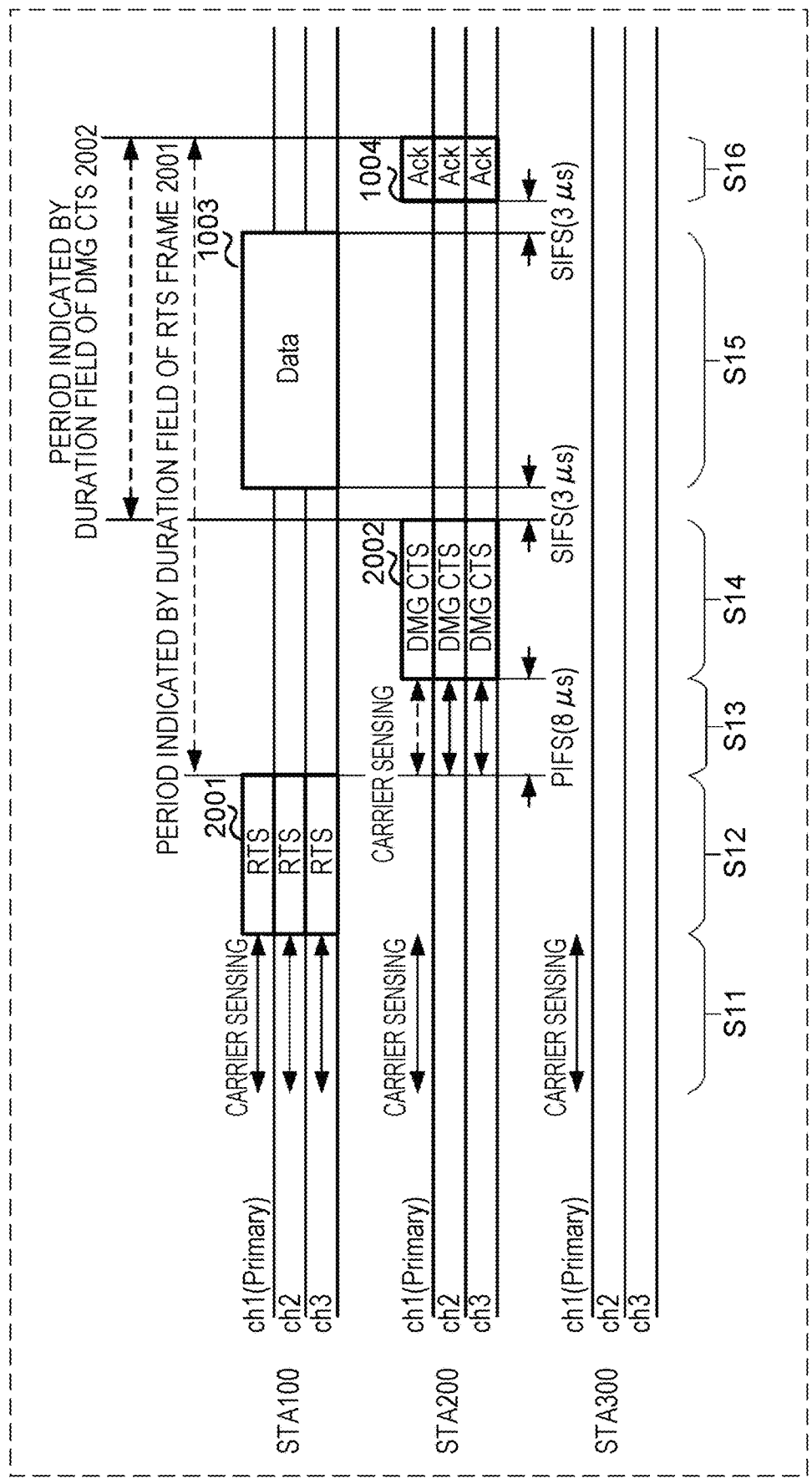
FIG. 3 is a diagram illustrating an example of data communication of a wireless communication system according to a first embodiment.

As opposed to this, the STA 200 performs carrier sensing regarding part of the multiple channels ch1, ch2, and ch3, e.g., channel ch1, in step S11 in FIG. 3, and carrier sensing is not performed for the other channels ch2 and ch3. In this case, the STA 200 may perform carrier sensing of the channels ch1, ch2, and ch3 after receiving the RTS frame 2001. Note that the STA 200 may exclude the channel regarding which carrier sensing was performed before receiving the RTS frame 2001 (step S11), e.g., channel ch1 in FIG. 3, from candidates for carrier sensing to be performed after reception of the RTS frame 2001.

Accordingly, in step S13, the STA 200 may, out of the multiple channels ch1, ch2, and ch3, perform carrier sensing regarding channels ch2 and ch3 which have not been subjected to carrier sensing at the reception time of the RTS frame 2001, for example.

Note that carrier sensing performed by the STA 200 (and STA 300) before reception of the RTS frame 2001 (step S11) is an example of "first carrier sensing". Carrier sensing performed by the STA 200 (and STA 300) after reception of the RTS frame 2001 and before reception of the data frame 1003, i.e., before transmission of the CTS frame 2002 (step S13) is an example of "second carrier sensing".

The STA 100 stands by to receive the CTS frame 2002 after transmission of the RTS frame 2001. After transmitting the RTS frame 2001, the STA 100 may receive the CTS frame 2002 after SIFS as in FIG. 2, or may receive the CTS frame 2002 after PIFS as in FIG. 3.

For example, the STA 100 stands by for at least a CTSTimeout time. The CTSTimeout is time that can be expressed by the following Expression (1), for example.

$$CTSTimeout = aPIFSTime + aSlotTime + aRxPHYStartDelay \quad (1)$$

Here, "aPIFSTime" represents PIFS (e.g., 8 μs). Also, "aSlotTime" represents a value including time required for detection of a physical (PHY) layer packet (hereinafter, abbreviated to "PHY packet") at the receiver and delay time required for MAC processing. An example of MAC processing is format analysis of the RTS frame 2001. The "aSlotTime" is defined as 5 μs in the 11ad standard.

The "aRxPHYStartDelay" represents delay time from the receiver starting reception of a PHY packet to detection of a MAC frame, and is defined as 10 μs in the 11ad standard, for example.

Note that in the 11ad standard, "CTSTimeout" is obtained by the following Expression (2) using "aSIFSTime" that represents SIFS (e.g., 3 μs) for example.

$$CTSTimeout = aSIFSTime + aSlotTime + aRxPHYStartDelay \quad (2)$$

In a case of having transmitted the RTS frame 2001 over a single channel (omitted from illustration in FIG. 3), the STA 100 may perform standby for the CTS frame 2002 in the time indicated by "CTSTimeout" in Expression (2).

Also, in a case of having transmitted the RTS frame 2001 over multiple channels, as exemplified in FIG. 3, standby for the CTS frame 2002 may be performed in the time indicated by "CTSTimeout" in Expression (1). Accordingly, even if the STA 100 does not know whether the STA 200 will transmit the CTS frame 2002 after SIFS or after PIFS, the STA 100 can receive the CTS frame.

Also, the STA 200 performs carrier sensing of multiple channels after receiving the RTS frame 2001 (step S13).

Accordingly, the STA 200 can be made to perform carrier sensing on a channel (e.g., primary channel ch1) that is part of the multiple channels (step S11) before reception of the RTS frame 2001. Thus, the electric power consumption of the STA 200 can be reduced as compared to a case of performing carrier sensing for all channels over which transmission of the data frame 1003 is planned. Also, the STA 200 can reduce the electric power consumption in step S13 by setting channels, out of the multiple channels, that have not been subjected to carrier sensing at the time of having received the RTS frame 2001, to be the object of carrier sensing after reception of the RTS frame 2001.

Step S14

In a case where CCA busy has not been detected at the channel ch1 in step S11 and the channels ch2 and ch3 in step S13, the STA 200 transmits the CTS frame 2002 addressed to the STA 100 over each of the channels ch1, ch2, and ch3. Note that in a case where carrier sensing of channel ch1 has been performed in step S13, the CTS frame 2002 is transmitted addressed to the STA 100 over channel ch1, in a case where CCA busy has not been detected at channel ch1 in step S13.

Step S15

In a case of having received the CTS frame 2002 over the multiple channels ch1, ch2, and ch3, the STA 100 transmits the data frame 1003 by channel bonding of the multiple channels ch1, ch2, and ch3. Note that the STA 100 may transmit multiple data frames 1003 in the period indicated by the duration field in the RTS frame 2001.

Step S16

After having received the data frame 1003, e.g., after SIFS after reception of the data frame 1003 ending, the STA 200 may transmit an Ack frame, or a Block Ack frame that is omitted from illustration, to the STA 100, for example. In the period indicated by the duration field in the RTS frame 2001, the STA 100 may standby for reception of the Ack frame 1004 or Block Ack frame.

Now, antennas for performing carrier sensing will be described. In a case of having multiple antenna arrays, the STA 200 may perform carrier sensing using a selected antenna array. Thus, the STA 200 can further increase reception gain in the direction where the STA 100 is located.

First, in a case of selecting an antenna array in step S11, the communication partner (STA 100) is unknown, so the STA 200 may use a method of randomly selecting the antenna array for each beacon interval, for example, or a method of periodically selecting the antenna array for each beacon interval, for example.

Next, in a case of selecting the antenna array in step S13, the communication partner (STA 100) is known since the RTS frame 2001 has been received. After having selected the antenna array to use for reception of the data frame 1003 in step S14 in accordance with the value of the transmission source address of the RTS frame 2001, the STA 200 may perform carrier sensing using the selected antenna array.

Now, regarding selection of the antenna array for carrier sensing in FIG. 2, there are cases where the STA 200 does not have an optimal antenna array for communication with the STA 100, since data communication (step S4) is performed using the antenna array that was used for carrier sensing (step S1). Conversely, regarding selection of the antenna array for carrier sensing in FIG. 3, carrier sensing is performed after antenna selection in step S13, so data communication can be performed using an optimal antenna array, and communication quality can be improved.

Note that in step S13 in FIG. 3, the STA 200 may perform reception beamforming to improve reception gain regarding the direction where the STA 100 is located. For example, the STA 200 may reference the results of the aforementioned beamforming training carried out beforehand, and set the receiving antenna array to a beam pattern having directionality in the direction where the STA 100 is located.

Also, in step S14 in FIG. 3, the STA 200 may perform transmission beamforming to improve transmission gain of the transmitting regarding the direction where the STA 100 is located. For example, the STA 200 may reference the results of the aforementioned beamforming training carried out beforehand, and set the transmitting antenna array to a pattern having directionality in the direction where the STA 100 is located.

Note that in a case where the directionality patterns of the receiving antenna and transmitting antenna are the same or similar, the STA 200 can improve measurement sensitivity of signals (which may include interference waves) arriving from the direction where the STA 100 is located by reception beamforming in step S13.

The directionality patterns of the receiving antenna and transmitting antenna being the same or similar may be referred to as "antenna pattern reciprocity". Also, a transmitting antenna or receiving antenna regarding which directionality pattern has been set may be referred to as "directional antenna" for the sake of convenience.

In step S14, the STA 200 can improve the probability of the CTS frame 2002 reaching the STA 100 by transmitting the CTS frame 2002 by performing transmission beamforming in the direction where the STA 100 is located.

Now, in a case where here is antenna pattern reciprocity, confirmation can be made that there is no STA located in the direction where the transmission beam would cause interference, by selecting the reception beam to perform carrier sensing. In a case where there is no antenna pattern reciprocity, or in a case where there is no time to spare for selecting the reception beam (e.g., FIG. 2), the STA 200 performs carrier sensing over a broad area using a receiving q-omni antenna 115 (described later with reference to FIG. 6A), so unnecessary CCA busy is detected, and the probability of missing communication opportunities with the STA 100 increases.

For example, the STA 200 measures interference waves from other STAs (e.g., STA 300) present in the direction where the STA 100 is located. In a case where measured interference waves exist here, the STA 200 transmits the CTS frame 2002 using transmission beamforming, and thereby can improve the probability that the CTS frame 2002 will reach the STA 100.

Thus, using beamforming in communication between the STA 100 and the STA 200 can increase the probability of the STA 100 and STA 200 obtaining a communication opportunity with each other. Also, interference that the communication between the STA 100 and STA 200 has on other STAs (e.g., STA 300) can be reduced.

For example, in a case where signals that are interference waves arrive at the STA 200 from a direction different from that of the STA 100, the probability of detection of CCA busy due to interference waves in step S13 can be reduced, due to the STA 200 using beamforming. Also, the reception power of the CTS frame 2002 that the STA 200 has transmitted addressed to the STA 100, at the STA 300 at a direction that is different from that of the STA 100, is lower.

Accordingly, in a case where the STA 200 is in an environment of receiving signals that are interference waves arriving from a direction that is different from that of the STA 100, the probability of the CTS frame 2002 reaching the STA 100 can be increased. The STA 100 can start transmission of data addressed to the STA 200 by the STA 100 having received the CTS frame 2002 and obtained a TXOP.

Note that the STA 300 and other STAs omitted from illustration may each carry out the same procedures as those in FIG. 3 by using the RTS frame 2001 and CTS frame 2002, in the same way as the STA 100 and STA 200, by using beamforming. For example, while the first STA 100 and the second STA 200 are performing communication using beamforming by the procedures exemplified in FIG. 3, the third STA 300 and a fourth STA may also be performing communication using beamforming by the procedures exemplified in FIG. 3, in parallel. Also, for example, the second STA 200 and the fourth STA may perform carrier sensing using directional antennas in step S13. Accordingly, the third STA 300 and the fourth STA can perform communication in a state where influence on the first STA 100 and second STA 200 has been reduced.

Note that in step S13, there are cases where the STA 200 detects no CCA busy at channels ch1 and ch2 of the channels ch1, ch2, and ch3, but detects CCA busy at ch3. In this case, the STA 200 in step S14 may transmit the CTS frame 2002 over channels ch1 and ch2 where no CCA busy was detected, and does not have to perform transmission of the CTS frame 2002 using the channel ch3.

Also, the STA 100 transmits the data frame 1003 in step S15 using the channels ch1 and ch2 out of the channels ch1, ch2, and ch3, that have received the CTS frame 2002. The STA 100 does not have to transmit the data frame 1003 over the channel ch3 that did not receive the CTS frame 2002. Thus, the STA 200 transmits the CTS frame 2002 using channels where CCA busy was not detected in step S13, so interreference to other STAs (e.g., STA 300) can be reduced.

The STA 200 performs carrier sensing in step S11 regarding part of multiple channels that are usable for transmission of the data frame 1003, so the electric power consumption in standby state can be reduced.

RTS Frame Format

Figure 4:
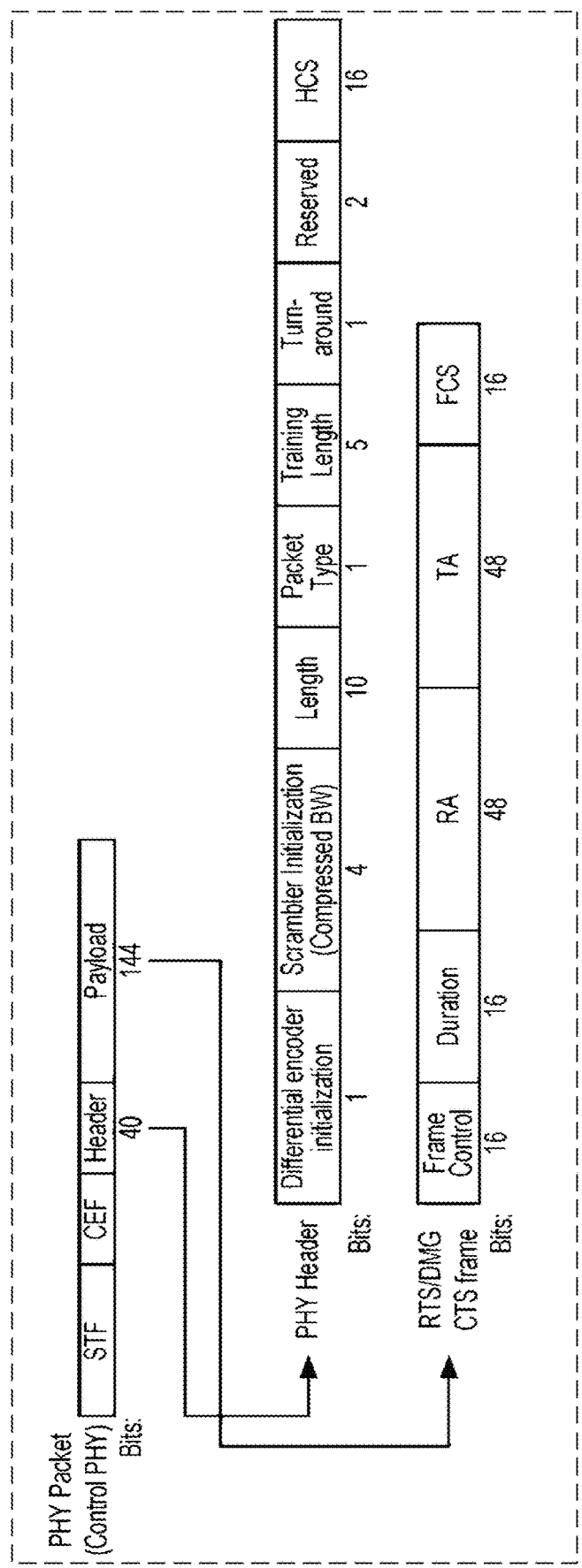
FIG. 4 is a diagram illustrating an example of the format of a request to send (RTS) frame according to the first embodiment.

Next, an example of the format of the RTS frame will be described with reference to FIG. 4. FIG. 4 illustrates an example of a MAC frame format and the configuration of a physical layer (PHY) packet together. In FIG. 4, short training field (STF) and channel estimation field (CEF) are equivalent to the preamble portion of a PHY packet.

The Header (PHY Header) may include the following fields, for example.

differential encoder initialization field
scrambler initialization field
Length field
Packet field
training Length field
turnaround field
reserved field (reserved bits)
header check sequence (HCS) field The payload of a PHY packet includes, for example, an RTS frame (1001 or 2001). The RTS frame may include, for example, a frame control field, duration field, receiving station address (RA) field, transmitting station address (TA) field, and frame check sequence (FCS) field.

In a case where the value of the reserved field in the PHY header is "11" (binary), this indicates that the data frame 1003 will be transmitted over multiple channels. In this case, the scrambler initialization field is replaced by a compressed bandwidth (BW) field in which information for identifying the transmission operation mode over multiple channels is set. On the other hand, in a case where the value of the reserved field in the PHY header is not "11" (binary), this indicates that the data frame 1003 will be transmitted over a single channel.

FIGS. 5A through 5C illustrate an example of values of compressed BW fields. Note that the shaded portions are the selected channels. The compressed BW field indicates the No. of the channel used for transmission of the data frame 1003 in a transmission opportunity (TXOP) after the data transmission source STA has transmitted an RTS frame.

FIG. 5A illustrates an example of a single-channel compressed BW field (0), and examples of values of compressed BW fields by channel bonding (1 through 5). With regard to a compressed BW field in a case of channel bonding, values of different compressed BW fields may be allocated to combinations (patterns) with different occupied channel Nos. that are not duplicative. For example, in channel bonding by two channels and three channels, different values ("1 or 2" and "3 or 4") as to combinations of different occupied channel Nos. may be set in the compressed BW field. In channel bonding by four channels, one value (5) corresponding to one combination of occupied channel Nos. is set to the compressed BW field.

FIG. 5B illustrates examples of values of the compressed BW field in channel aggregation (CA) of two 2.16-GHz channels. In the example in FIG. 5B, one of "6 through 9" corresponding to each combination of four occupied channel Nos. is set to the compressed BW field. FIG. 5C illustrates an example of values of a compressed BW field in CA of two 4.32-GHz channels (10). Note that "11 through 15" in FIG. 5C are reserved values.

In step S12 in FIG. 3, the STA 100 sets the value of the compressed BW field in the RTS frame 2001 to "3", since the data frame 1003 is transmitted by channel bonding occupying the three channels of ch1, ch2, and ch3 (see FIG. 5A). Note that ch1 through ch4 including the ch4 that is omitted from illustration in FIG. 3 are the object, so the value of the compressed BW field can be set to "3".

A compressed BW field value of "3" indicates that the operation mode is three-channel bonding (2.16 GHz×3=6.48 GHz), and the smallest channel No. is an odd number (e.g., ch1). For example, the STA 100 transmits the RTS frame to each of the channels (ch1, ch2, and ch3) occupying the bonding channels indicated by the compressed BW field value="3" (channel bonding of ch1, ch2, and ch3 in the case of FIG. 3).

Returning to FIG. 4, the frame control field includes a type value indicating that the frame is an RTS frame, for example. The time that it will take for frame transmission/reception at the STA 100 that is the transmission source of the RTS frame 2001, for example, after transmission of the RTS frame 2001 as illustrated in FIG. 3, is set in the duration field. For example, the STA 100 sets the total time that it will take for reception of the CTS frame 2002, transmission of the data frame 1003, and reception of the Ack frame 1004, in the duration field of the RTS frame 2001.

Information indicating the addressee of the frame is set in the RA field, and information indicating the transmission source of the frame is set in the TA field, for example. In the example illustrated in FIG. 3, the STA 100 sets the MAC address of the STA 200 in the RA field, and sets the MAC address of the STA 100 in the TA field.

Other Fields

An overview of the other fields in FIG. 4 stipulated in the 11ad standard is as follows. An initial value of the differential encoder, for example, is set in the differential encoder initialization field. A data length (e.g., octet count) included in the payload field, for example, is set in the Length field.

Information indicating the type of training field in a case of a PHY packet including a training field (omitted from illustration), for example, is set in the packet type. Information indicating the length of the training field in a case of a PHY packet including a training field, for example, is set in the training Length field.

"1" is set in the turnaround field, for example, in a case of requesting a SIFS response to a PHY packet. Note however, in a case where the PHY packet includes an RTS frame, the turnaround field is set to "0".

Note that the format of the DMG CTS frame 2002 may be the same as that of the RTS frame 2001 exemplified in FIG. 4, for example. In a case of transmitting a DMG CTS frame 2002, the STA 200 sets a value corresponding to the channel transmitting the DMG CTS frame 2002 to the compressed BW field. For example, in the example in FIG. 3, the STA 200 sets the value of the compressed BW field of the DMG CTS frame 2002 to "3", as described by way of FIG. 5A.

Also, the STA 200 sets the value of the duration field of the DMG CTS frame 2002 so that the end time of the period indicated by the duration fields of the RTS frame 2001 and DMG CTS frame 2002 agree with each other. Note that "agree" is not restricted to the meaning of completely agreeing, but rather means that error (e.g., error of 1 µs or less) is tolerated.

For example, the value of the duration field of the DMG CTS frame 2002 may be a value obtained by subtracting the PIFS (e.g., 8 µs) and the frame length of the DMG CTS frame 2002 from the value of the duration field of the RTS frame 2001.

Configuration Example of STA

Figure 6A:
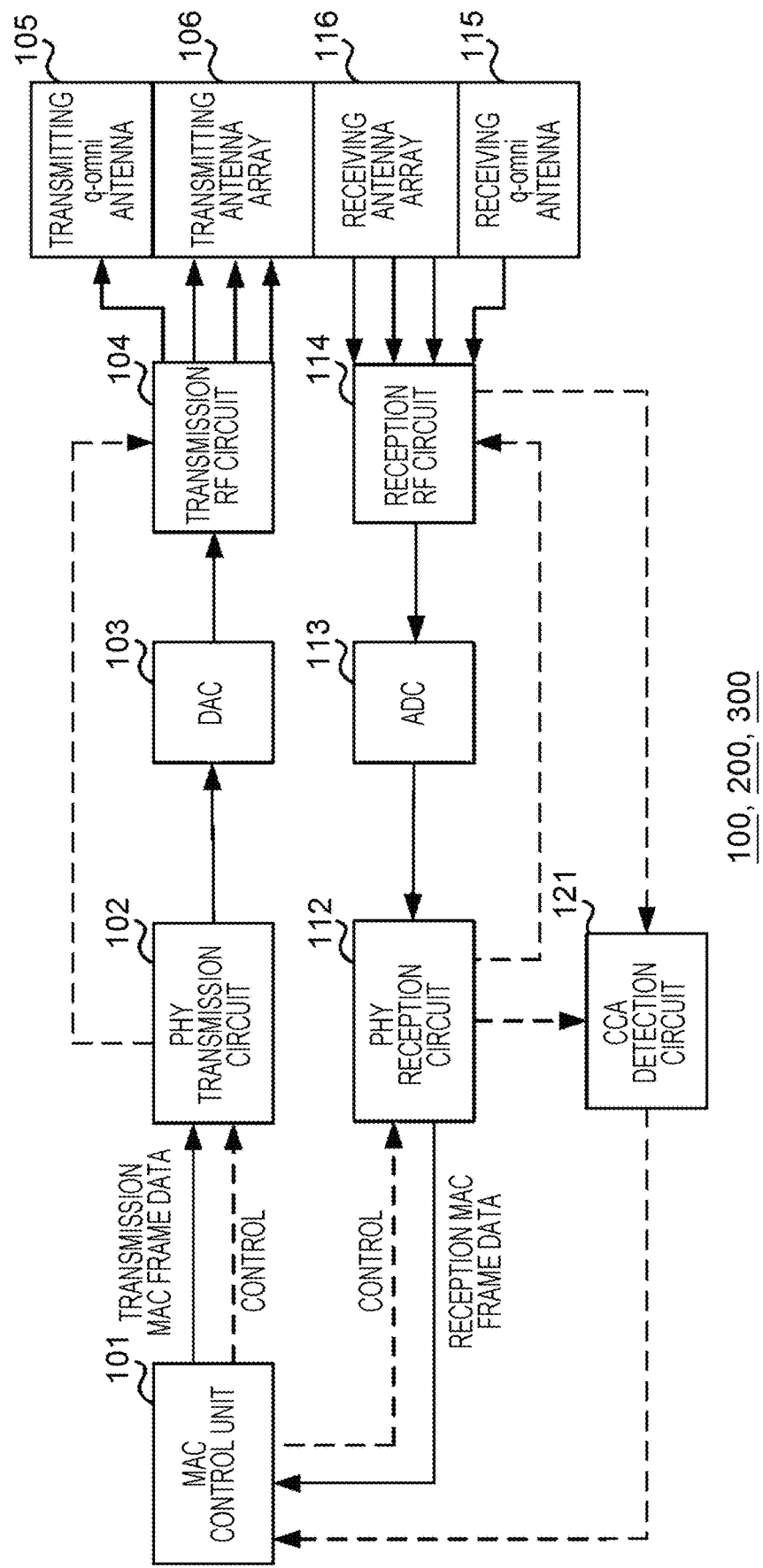
FIG. 6A is a block diagram illustrating a configuration example of a station (STA) exemplified in FIGS. 1 and 3.
Figure 6B:
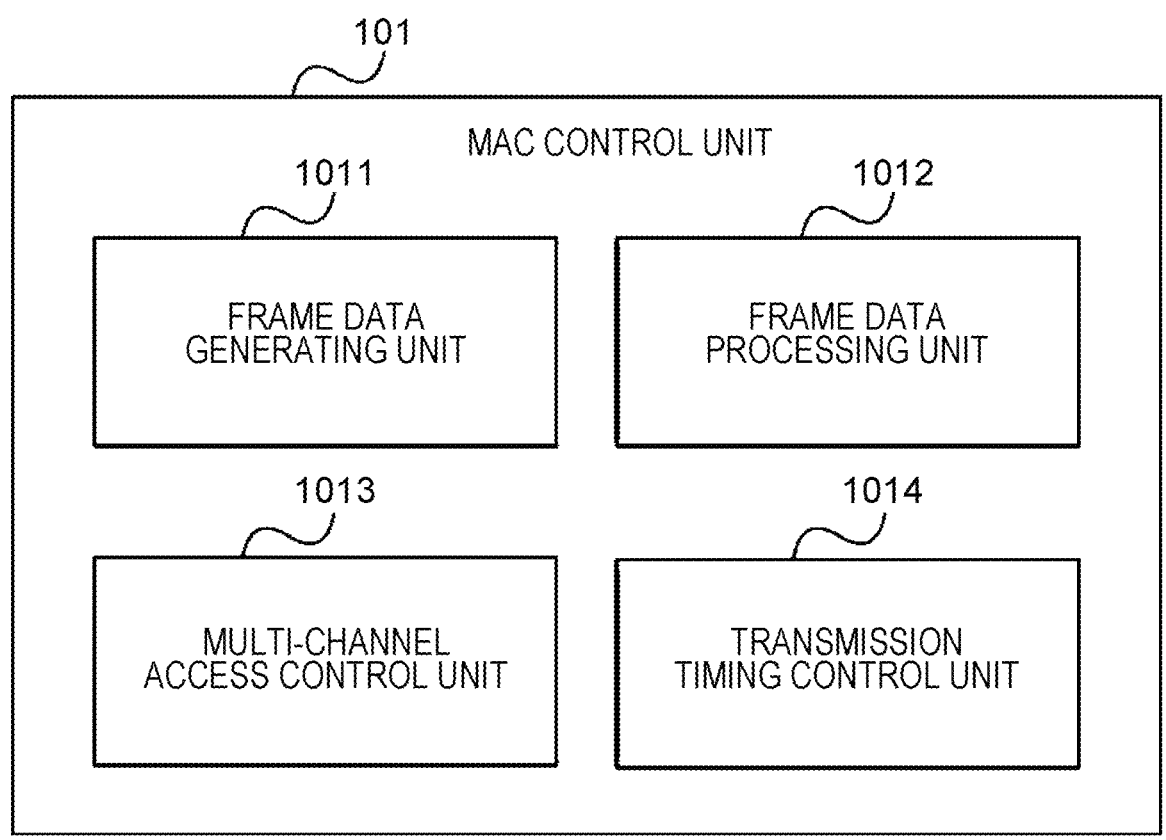
FIG. 6B is a block diagram illustrating a configuration example of a media access control (MAC) control unit exemplified in FIG. 6A.

Next, a configuration example of the STA 100 will be described with reference to FIGS. 6A and 6B. FIG. 6A is a block diagram illustrating a configuration example of the STA 100, and FIG. 6B is a block diagram illustrating a configuration example of a MAC control unit 101. Note that the (second) STA 200, (third) STA 300, and fourth STA, that have already been described, can be understood to have an equivalent configuration as the configuration exemplified in FIGS. 6A and 6B.

The STA 100 may include, for example, the MAC control unit 101, a PHY transmission circuit 102, a digital-to-analog converter (DAC) 103, a transmission RF circuit 104, a transmitting q-omni antenna 105, and a transmitting antenna array 106. The STA 100 may also include, for example, a PHY reception circuit 112, an analog-to-digital converter (ADC) 113, a reception RF circuit 114, the receiving q-omni antenna 115, a receiving antenna array 116, and a CCA detection circuit 121, as illustrated in FIG. 6A. Note that the CCA detection circuit 121 may be included in the PHY reception circuit 112.

The MAC control unit 101 generates transmission MAC frame data, for example. The MAC control unit 101 generates data of the RTS frame 2001 and outputs to the PHY transmission circuit 102 in step S12 in FIG. 3, for example.

The MAC control unit 101 also outputs, to the PHY transmission circuit 102, control information for the generated transmission MAC frame to be appropriately encoded and modulated (e.g., including header information of the PHY frame, and information relating to transmission timing).

A configuration example of the MAC control unit 101 will be described later with reference to FIG. 6B. The PHY transmission circuit 102 encodes and modulates the transmission MAC frame data input from the MAC control unit 101, based on the control information input from the MAC control unit 101, and generates PHY frame data. The generated PHY frame data is, for example, converted into analog signals at the DAC 103, and thereafter converted into wireless signals at the transmission RF circuit 104.

The PHY transmission circuit 102 controls the transmission RF circuit 104. For example, the PHY transmission circuit 102 performs settings of center frequency in accordance with specified channels, control of transmission power, and control of directionality, for the transmission RF circuit 104.

The transmitting q-omni antenna 105 transmits wireless signals input from the transmission RF circuit 104, for example, as non-directional wireless signals. Note that "q-omni" is short for "quasi-omnidirectional (quasi-omni)".

The transmitting antenna array 106 transmits wireless signals input from the transmission RF circuit 104, for example, as wireless signals having directionality. The transmitting antenna array 106 does not have to have an array configuration. Any antenna having an antenna configuration where directionality is controlled may be referred to as an "antenna array".

The transmitting q-omni antenna 105 has a broader beam width than the transmitting antenna array 106. On the other hand, the transmitting antenna array 106 has gain that is greater in a particular direction than in other directions, in accordance with control of directionality. The gain of the transmitting antenna array 106 in the particular direction may be greater than the gain of the transmitting q-omni antenna 105.

The transmitting antenna array 106 may have greater input power from the transmission RF circuit 104 as compared to the transmitting q-omni antenna 105. For example, the transmission RF circuit 104 may be provided with transmission amplifiers for each of the antenna elements making up the transmitting q-omni antenna 105 and the transmitting antenna array 106. In this case, the transmitting antenna array 106 having a great number of antenna elements has greater input power as compared to the transmitting q-omni antenna 105 that has fewer antenna elements.

Note that the STA 100 may transmit quasi-omnidirectional wireless signals using the transmitting antenna array 106. In other words, the transmitting antenna array 106 may include the transmitting q-omni antenna 105. For example, the STA 100 may control the transmission RF circuit 104 to input power to each of the multiple antenna elements of the transmitting antenna array 106, thereby transmitting wireless signals having directionality from the transmitting antenna array 106.

Also, the STA 100 may control the transmission RF circuit 104 to input power to part of the multiple antenna elements of the transmitting antenna array 106, thereby transmitting quasi-omnidirectional wireless signals from the transmitting antenna array 106. Note that the number of antenna elements used for transmission of quasi-omnidirectional wireless signals may be smaller than the number of antenna element used for transmission of directional wireless signals.

A block including the PHY transmission circuit 102, DAC 103, transmission RF circuit 104, transmitting q-omni antenna 105, and transmitting antenna array 106, may be understood to be equivalent to an example of a transmission circuit that transmits RTS frames and/or CTS frames.

The receiving q-omni antenna 115 outputs wireless signals received from a communication device that is a communication partner (e.g., the STA 200) to the reception RF circuit 114. The receiving q-omni antenna 115 has quasi-omnidirectionality in the relation between the direction of arrival of wireless signals and gain.

The receiving antenna array 116 outputs the received wireless signals to the reception RF circuit 114, for example. The receiving antenna array 116 may have a stronger directionality than the receiving q-omni antenna 115 in the relation between the direction of arrival of wireless signals and gain. The receiving array antenna 116 does not have to be an array configuration, and may be referred to as an "antenna array" as long as an antenna configuration where the directionality can be controlled.

The receiving q-omni antenna 115 has a broader beam width than the receiving antenna array 116. On the other hand, the receiving antenna array 116 has gain that is greater in a particular direction than in other directions, in accordance with control of directionality. The gain of the receiving antenna array 116 in the particular direction may be greater than the gain of the receiving q-omni antenna 115.

The reception RF circuit 114 convers the wireless signals received by the receiving q-omni antenna 115 and receiving antenna array 116 into baseband signals.

The ADC 113 converts the analog baseband signals input from the reception RF circuit 114 into digital baseband signals.

The PHY reception circuit 112 performs reception processing on the digital baseband signals input from the ADC 113, including, for example, synchronization, channel estimation, equalization, and demodulation, thereby generating a reception PHY frame. The PHY reception circuit 112 also performs analysis of header signals and error-correction decoding on the reception PHY frame, thereby generating reception MAC frame data.

The reception MAC frame data is input to the MAC control unit 101, for example. The MAC control unit 101 analyzes the contents of the reception MAC frame data, and transfers data to an upper layer (omitted from illustration). The MAC control unit 101 also generates transmission MAC frame data for making a response in accordance with the reception MAC frame data.

For example, in a case of having judged to have received a final sector sweep (SSW) frame of an initiator sector sweep (ISS) in sector level sweep (SLS) procedures, the MAC control unit 101 may generate an SSW frame for a responder sector sweep (RSS) including appropriate SSW feedback information. The SSW frame may be input to the PHY transmission circuit 102 as transmission MAC frame data.

The PHY reception circuit 112 controls the reception RF circuit 114, for example. The PHY reception circuit 112 may perform, for example, settings of center frequency in accordance with specified channels, control of reception power including automatic gain control (AGC), and control of directionality, for the reception RF circuit 114. The MAC control unit 101 also controls the PHY reception circuit 112, for example. The MAC control unit 101 may, for example, instruct the PHY reception circuit 112 to start or stop reception, or to start or stop carrier sensing.

The STA 100 may set the reception RF circuit 114 in FIG. 6A, for example, to perform carrier sensing using the receiving antenna array 116 in FIG. 6A as a directional antenna in step S11 in FIG. 3. The STA 100 may also set the transmission RF circuit 104 in FIG. 6A to transmit an RTS frame using the transmitting antenna array 106 in FIG. 6A as a directional antenna in step S12.

The STA 200 may set the reception RF circuit 114 in FIG. 6A to perform carrier sensing using the receiving antenna array 116 in FIG. 6A as a directional antenna in step S13 in FIG. 3. The STA 200 may also set the transmission RF circuit 104 in FIG. 6A to transmit a CTS frame 2002 using the transmitting antenna array 106 in FIG. 6A as a directional antenna in step S14.

Settings of carrier sensing and/or directional antenna for the reception RF circuit 114 are made by the MAC control unit 101, which is an example of a control circuit, outputting control signals corresponding to the settings to the reception RF circuit 114, for example. Settings of directional antenna for the transmission RF circuit 104 are made by the MAC control unit 101 outputting control signals corresponding to the settings to the transmission RF circuit 104, for example.

In a case where another STA 300 exists in a direction different from the STA 200, the STA 100 can reduce the probability of detecting a CCA busy due to transmission signals from the STA 300, by performing carrier sensing using the receiving antenna array 116 as a directional antenna in step S11 in FIG. 3.

Accordingly, in a case of an environment where transmission signals from another STA 300 that is different from the STA 200 that is the communication partner, which will be interference waves, might be received, the STA 100 can increase the probability of obtaining a communication opportunity with the STA 200 by using the receiving antenna array 116 as a directional antenna. Also, in a case where another STA 300 exists in a direction different from the STA 100, the STA 200 can reduce the probability of detecting a CCA busy due to interference waves from the STA 300, by performing carrier sensing using the receiving antenna array 116 as a directional antenna in step S13.

Accordingly, in a case of an environment where transmission signals from another STA 300 that is different from the STA 100 that is the communication partner, which will be interference waves, might be received, the STA 200 can increase the probability of obtaining a communication opportunity with the STA 100 by using the receiving antenna array 116 as a directional antenna.

The CCA detection circuit 121 determines whether or not CCA busy has been detected, for each channel, based on the reception power for each channel measured by the reception RF circuit 114, and the preamble correlation level at the primary channel measured by the PHY reception circuit 112, for example. For example, the CCA detection circuit 121 may determine that CCA busy has been detected at the primary channel in a case where at least one of (a) case where correlation of preamble signals equivalent to signal power of "−78 dBm" or greater (e.g., "control PHY preamble signals" in the 11ad standard) has been detected, (b) case where correlation of preamble signals equivalent to signal power of "−68 dBm" or greater (e.g., "single carrier (SC) PHY preamble signals" in the 11ad standard) has been detected, and (c) case where reception of some sort of wireless signals (regardless of signal type) with signal power of "−48 dBm" or greater has been detected has been satisfied regarding the primary channel.

In a case where reception of some sort of wireless signals (regardless of signal type) with signal power of "−48 dBm" or greater has been detected at a non-primary channel, the CCA detection circuit 121 may determine that CCA busy has been detected at the non-primary channel, for example. The MAC control unit 101 is notified of detection of CCA busy for each channel, for example.

Note that a block including the PHY reception circuit 112, ADC 113, reception RF circuit 114, receiving q-omni antenna 115, and receiving antenna array 116, may be understood to be equivalent to an example of a reception circuit that receivers at least RTS frames and/or CTS frames.

Configuration Example of MAC Control Unit

A configuration example of the MAC control unit 101 exemplified in FIG. 6A will be described next with reference to FIG. 6B. The MAC control unit 101 may be provided with, for example, a frame data generating unit 1011, a frame data processing unit 1012, a multi-channel access control unit 1013, and a transmission timing control unit 1014, as illustrated in FIG. 6B.

The frame data generating unit 1011 generates transmission MAC frame data, for example at least one data of RTS frames, CTS frames, and transmission data frames, and outputs to the PHY transmission circuit 102.

The frame data processing unit 1012 receives reception MAC frame data from the PHY reception circuit 112, for example, and distinguishes the frame type and distinguishes transmission and reception addresses, and performs reception processing in accordance with the frame type that has been distinguished, for example.

The multi-channel access control unit 1013 decides channels to be used for transmission and reception, and sets the PHY transmission circuit 102 and PHY reception circuit 112 to settings corresponding to the channels that have been decided, for example. The multi-channel access control unit 1013 also distinguishes whether a received frame, for example, an RTS frame, is from single-channel transmission or multi-channel transmission.

Note that the multi-channel access control unit 1013 may distinguish channels over which an RTS frame was received, based on one or more information of (i) reception power for each channel measured by the reception RF circuit 114, (ii) preamble correlation level for each channel detected by the PHY reception circuit 112, and (iii) results of modulation and demodulation of signals for each channel by the PHY reception circuit 112, for example.

The MAC control unit 101 may be notified of information of (i) and (ii) via the CCA detection circuit 121, for example. In a case where the CCA detection circuit 121 is included in the PHY reception circuit 112, the MAC control unit 101 may be notified of information of (i) and (ii) by the PHY reception circuit 112.

The transmission timing control unit 1014 decides the timing of transmitting, for example, transmission MAC frame data, e.g., an RTS frame and/or CTS frame 2002, and set the decided timing to the PHY transmission circuit 102. For example, the transmission timing control unit 1014 may decide whether to transmit a CTS frame 2002 by SIFS (see FIG. 2) or by PIFS (see FIG. 3), based on information of the channel over which an RTS frame was received. Note that information of the channel over which an RTS frame was received is detected at the multi-channel access control unit 1013, for example.

Example of Operations

Next, an example of operations of the STA 200 in FIG. 3 will be described with reference to the flowchart exemplified in FIGS. 7A and 7B.

Step S11a

The STA 200 sets the reception antenna to quasi-omnidirectional (q-omni), for example. In other words, the STA 200 sets the reception RF circuit 114 to receive wireless signals using the receiving q-omni antenna 115. The STA 200 then performs carrier sensing (CS) of the primary channel using the receiving q-omni antenna 115.

Step S11a represents processing in the standby state of the STA 200. For example, the STA 200 continues carrier sensing until a packet (e.g., a packet of RTS frame 2001) is received from another STA (e.g., STA 100). In step S11a, the STA 200 performs carrier sensing regarding ch1, but does not perform carrier sensing regarding ch2 and ch3, so electric power consumption of the STA 200 in a standby state can be reduced.

Step S12*a*

The STA 200, in a standby state, receives an RTS frame 2001 transmitted by the STA 100.

Yes in Step S12*b*

The processing of the STA 200 branches in accordance with the results of carrier sensing in step S11*a*. For example, the STA 200 judges whether or not CCA busy has been detected in a predetermined period before receiving the RTS frame 2001 (e.g., PIFS), and branches the processing in accordance with the judgement results.

For example, in a case of having detected CCA busy in the PIFS before receiving the RTS frame 2001 (Yes), the STA 200 may judge that interference waves will be received from another STA (e.g., STA 300) on the primary channel, and end the processing. In this case, even if the RTS frame 2001 is received, the STA 200 does not transmit a CTS frame 2002, in order to avoid subjecting the other STA 300 to interference waves.

In other words, the STA 200 judges whether or not response by a CTS frame 2002 is permissible in accordance with the results of carrier sensing on the primary channel in the same way as with a terminal conforming to the 11ad standard, even if the RTS frame 2001 indicates multi-channel transmission. Accordingly, fairness of obtaining transmission opportunity can be maintained with other STAs including terminals conforming to the 11ad standard.

Note that even in a case where CCA busy is detected in the PIFS before receiving the RTS frame 2001 in step S12*b* (yes), the flow may be advanced to step S12*c* in a case where the RTS frame 2001 indicates multi-channel transmission.

The STA 200 can improve the probability of obtaining a communication opportunity with the STA 100 by performing carrier sensing again in step S13*b*, which will be described later. Details will be described later in FIGS. 8A and 8B.

No in Step S12*b*

In a case where the STA 200 does not detect CCA busy in the PIFS before receiving the RTS frame 2001 (No), the flow may be advanced to step S12*c*.

Step S12*c*

The STA 200 branches the processing in accordance with the value included in the RTS frame 2001 received in step S12*a*. In other words, the STA 200 judges whether the RTS frame 2001 has been transmitted over multiple channels or not, and branches the processing in accordance with the judgement results. For example, in a case where the value of the reserved bits (see FIG. 4) of the RTS frame 2001 is not "11" (binary) (No), judgement is made by the STA 200 that the RTS frame 2001 has been transmitted over a single channel. In this case, the STA 200 advances the processing to FIG. 7B. The processing of FIG. 7B will be described later.

On the other hand, in a case where the value of the reserved bits (see FIG. 4) of the RTS frame 2001 is "11" (binary) (Yes) in step S12*c*, judgement is made by the STA 200 that the RTS frame 2001 has been transmitted over multiple channels. In this case, the STA 200 judges the channels over which the RTS frame 2001 has been transmitted, based on the value of the compressed BW field, for example. For example, in a case where the value of the compressed BW field of the RTS frame 2001 is "3" (see FIG. 5A), and the channels ch1 through ch4 can be used for communication with the STA 100, judgment is made by the STA 200 that the RTS frame 2001 has been transmitted over channels ch1, ch2, and ch3.

Note that an arrangement may be made where the STA 200 decides usable channels (e.g., the aforementioned channels ch1 through ch4) before step S11*a*, and notifies the STA 100 of information related to the channels that have been decided.

Step S13*a*

In a case where judgement has been made in step S12*c* that the RTS frame 2001 was transmitted over multiple channels, the STA 200 switches the receiving antenna to directional. For example, the STA 200 uses the MAC control unit 101 to set the reception RF circuit 114 in FIG. 6A so that reception (which may include carrier sensing) is performed using the receiving antenna array 116 in FIG. 6A. The MAC control unit 101 also sets the reception RF circuit 114 and receiving antenna array 116 in FIG. 6 so that the directionality of the receiving antenna array 116 is directed toward the STA (e.g., STA 100) indicated in the TA field of the RTS frame 2001.

Now, controlling the directionality of the receiving antenna to a particular direction, in other words, performing reception beamforming, may include setting a settings value or control value where antenna gain is increased to the reception RF circuit 114 and/or receiving antenna array 116, for example. An example of the settings value or control value may be a value for setting or controlling the phase of antenna elements making up the receiving antenna array 116.

Step S13*b*

The STA 200 performs carrier sensing regarding channels that the compressed BW field of the RTS frame 2001 indicates. For example, in the example in FIG. 3, the channels that the compressed BW field indicates are channels ch1, ch2, and ch3, so the STA 200 performs carrier sensing regarding ch1, ch2, and ch3 in step S13*b*.

Step S14*a*

The STA 200 transmits a CTS frame 2002 over channels regarding which CCA busy was not detected in step S13*b*. For example, in a case where CCA busy is not detected on any of ch1, ch2, and ch3 in step S13*b*, the STA 200 transmits the CTS frame 2002 over ch1, ch2, and ch3 in step S14*a*. Also, in a case where CCA busy is not detected at either ch2 or ch3 in step S13*b*, but CCA busy was detected on ch1, for example, the STA 200 transmits the CTS frame 2002 over ch2 and ch3 in step S14*a*. Thus, the STA 200 performs carrier sensing regarding channels over which the RTS frame 2001 was transmitted, and transmits the CTS frame 2002 over channels where CCA busy is not detected.

Note that in a case where CCA busy is detected on the primary channel, settings may be made where the STA 200 does not transmit the CTS frame 2002 in step S14*a* over other channels where CCA busy was not detected. For example, in a case where CCA busy has been detected on channel ch1, the STA 200 does not have to transmit the CTS frame 2002 to channel ch1 and to the other channels ch2 and ch3.

Also, in a case where CCA busy is detected on the primary channel, the STA 200 may transmit the CTS frame 2002 over a channel other than the primary channel in step S14*a*. In this case, the STA 200 may notify the STA 100 of information indicating whether or not there is transmission of a CTS frame 2002 using a channel other than the primary channel. Note that information indicating whether or not there is transmission of a CTS frame 2002 may be included in signals transmitted to the STA 100 before step S11*a*. For example, information indicating whether or not there is transmission of a CTS frame 2002 may be included in a Capabilities element of an AR (association request) frame requesting the STA 100 for connection (association).

Step S15*a*

The STA 200 receives a data frame 1003 over the channels where the CTS frame 2002 was transmitted in step S14*b*.

Step S16*a*

The STA 200 transmits an Ack frame 1004 or Block Ack frame to the STA 100 over the channels where the data frame 1003 was received.

Next, the processing of FIG. 7B (steps S13*c*, S14*b*, S15*b*, and S16*b*), executed in a case where judgment is made that the RTS frame 2001 has been transmitted over a single channel (No) in step S12*c* will be described. In a case of single-channel transmission, the STA 200 may transmit a CTS frame 2002 over the primary channel, so that the STA 200 and STA 100 perform communication of data frames 1003 over the primary channel.

Step S13*c*

In a case of single-channel transmission, for example, the STA 200 sets the transmitting antenna to a directional antenna. For example, the STA 200 uses the MAC control unit 101 to set the reception transmission RF circuit 104 in FIG. 6A so as to transmit using the transmitting antenna array 106 in FIG. 6A. Also, the MAC control unit 101 sets the directionality of the transmitting antenna of the STA 200 to the direction where the STA indicated in the TA field of the RTS frame (e.g., STA 100) is located.

Controlling the directionality of the transmitting antenna to a particular direction, in other words, performing transmission beamforming, may include setting a settings value or control value where antenna gain is increased to the transmission RF circuit 104 and/or transmitting antenna array 106 in FIG. 6A, for example. An example of the settings value or control value may be a value for setting or controlling the phase of antenna elements making up the transmitting antenna array 106.

Figure 7A:
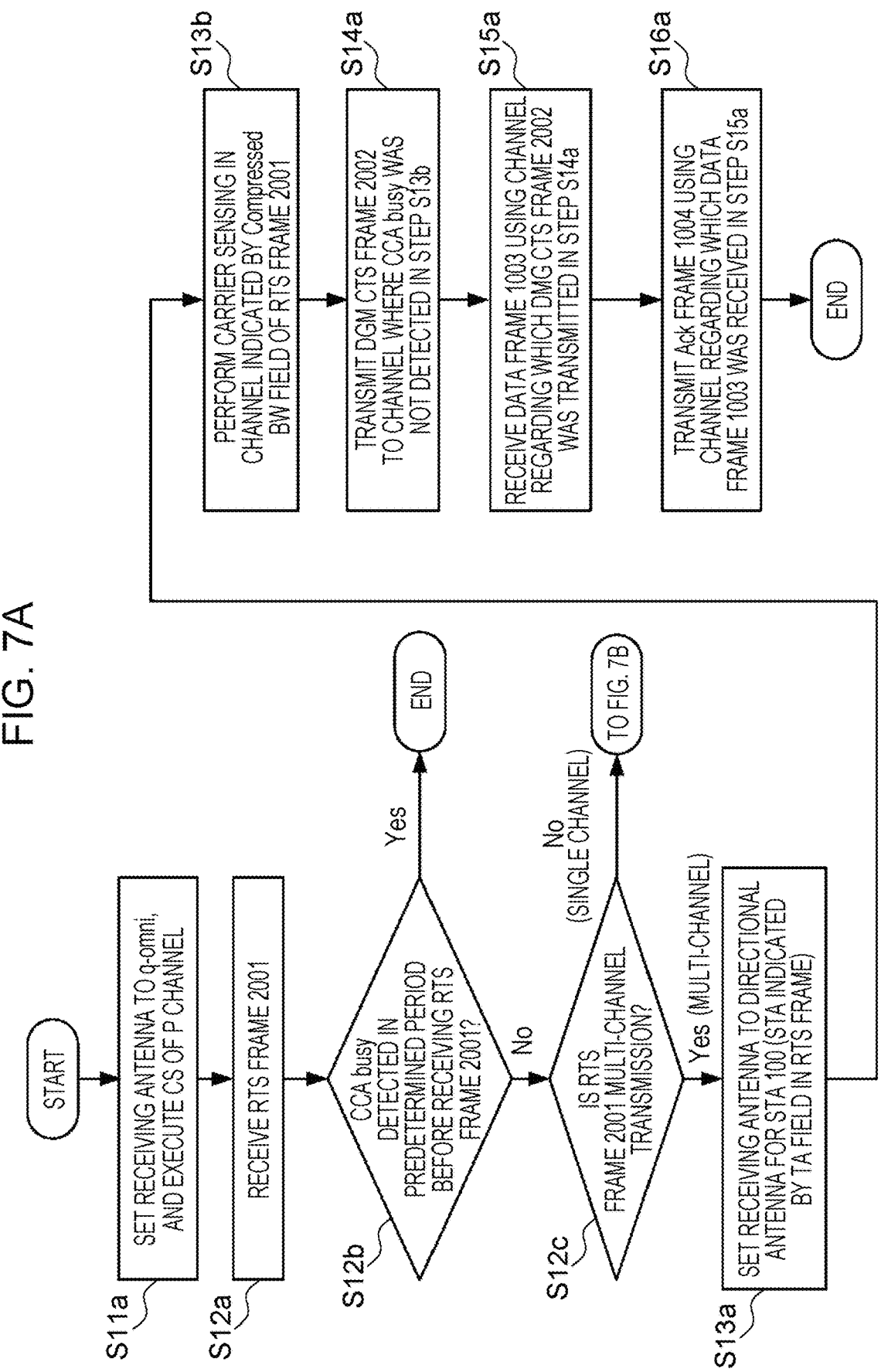
FIG. 7A is a flowchart illustrating an operation example of a STA according to the first embodiment.
Figure 7B:
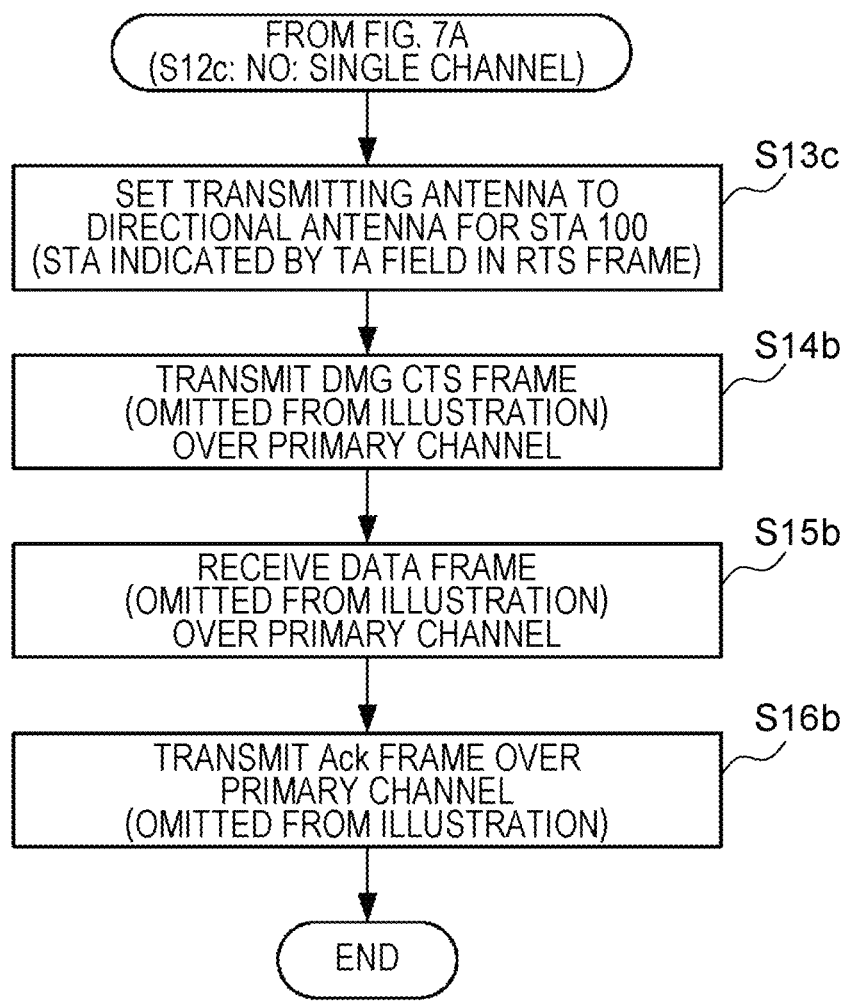
FIG. 7B is a flowchart illustrating an operation example of a STA according to the first embodiment.

Note that while the receiving antenna of the STA 200 is set to a directional antenna in step S13*a* in FIG. 7A in multi-channel transmission, the transmitting antenna of the STA 200 is set to a directional antenna in step S13*c* in FIG. 7B in single-channel transmission. In other words, in multi-channel transmission, the STA 200 performs reception by directional antenna (carrier sensing) after completion of reception of the RTS frame 2001, but in single-channel transmission, transmission by directional antenna is performed after completion of reception of the RTS frame 2001.

Note that whether multi-channel transmission or single-channel transmission is distinguished by the STA 200 based on the reserved field and compressed BW field of the RTS frame 2001, as described in step S12*c* in FIG. 7A. Accordingly, switching between reception processing corresponding to multi-channel transmission and transmission processing corresponding to single-channel transmission can be performed by the STA 200 with little delay.

Step S14*b*

The STA 200 transmits the CTS frame 2002 over the primary channel. In other words, the STA 200 notifies the STA 100 by the CTS frame 2002 that communication can be made with the STA 100 over the primary channel.

Step S15*b*

After transmission of the CTS frame 2002, the STA 200 receives a data frame 1003 over the primary channel.

Step S16*b*

After reception of the data frame 1003, the STA 200 transmits an Ack frame 1004 or Block Ack frame to the STA 100 over the primary channel. As described above, the STA 200 performs carrier sensing for not all but part of multiple channels before reception of an RTS frame 2001. Accordingly, the STA 200 can reduce electric power consumption due to carrier sensing in the standby state, as compared to a case of performing carrier sensing for all of multiple channels in standby state.

In a case of receiving an RTS frame 2001, the STA 200 performs carrier sensing with the directional antenna set toward the direction where the STA 100 that is the transmission source of the RTS frame 2001 is located. Accordingly, even in a case of receiving interference waves arriving from a direction different from the direction where the STA 100 is located, the STA 200 can reduce the probability of CCA busy being detected by the interference waves.

Thus, the STA 200 can increase the probability of obtaining opportunity of transmission of the CTS frame 2002 to the STA 100. Consequently, the reception data throughput from the STA 100 increases for the STA 200, since the reception opportunity of data frames 1003 transmitted by the STA 100 increases.

Modification

Figure 8A:
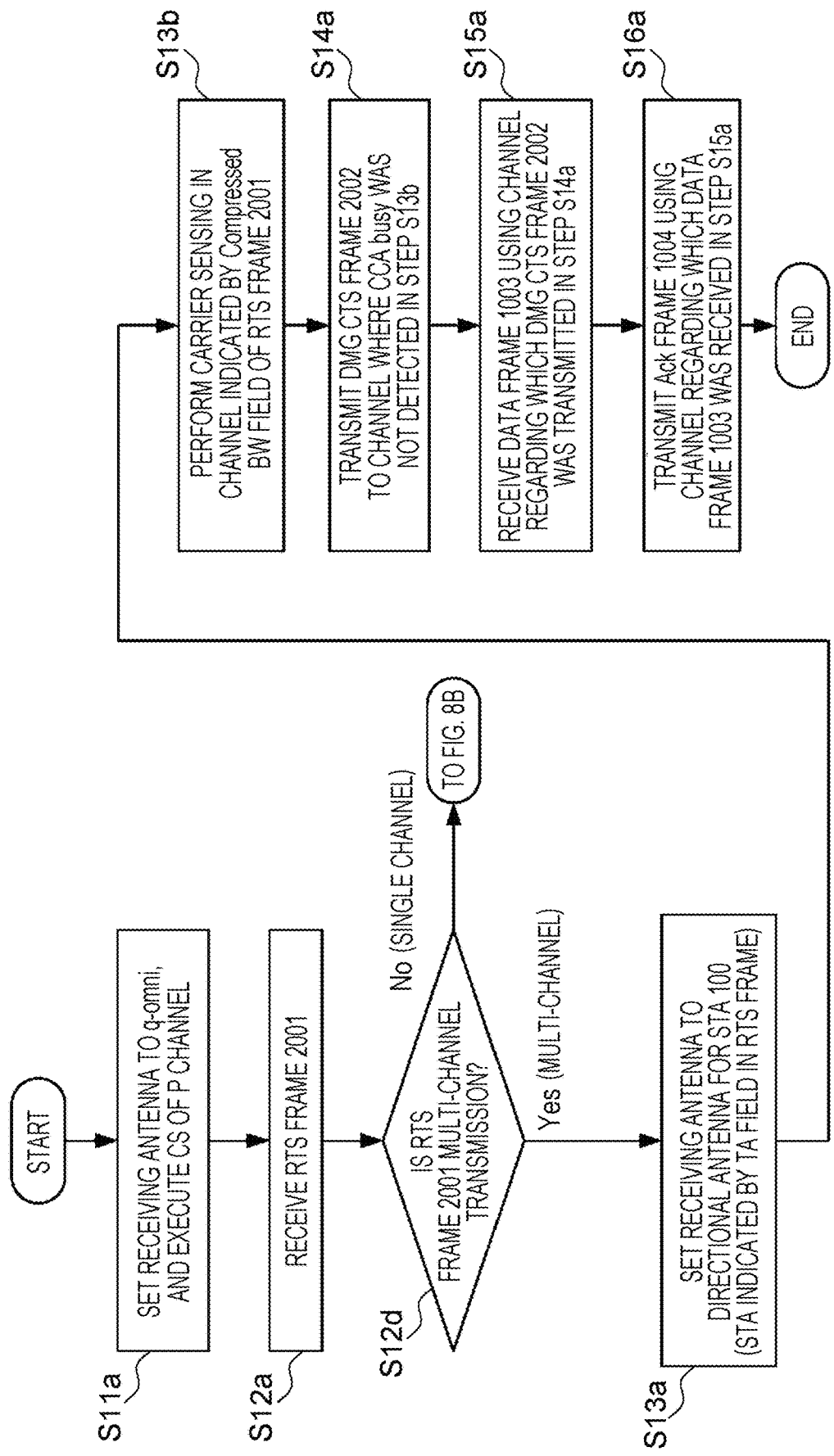
FIG. 8A is a flowchart illustrating an operation example of a STA according to a modification of the first embodiment.
Figure 8B:
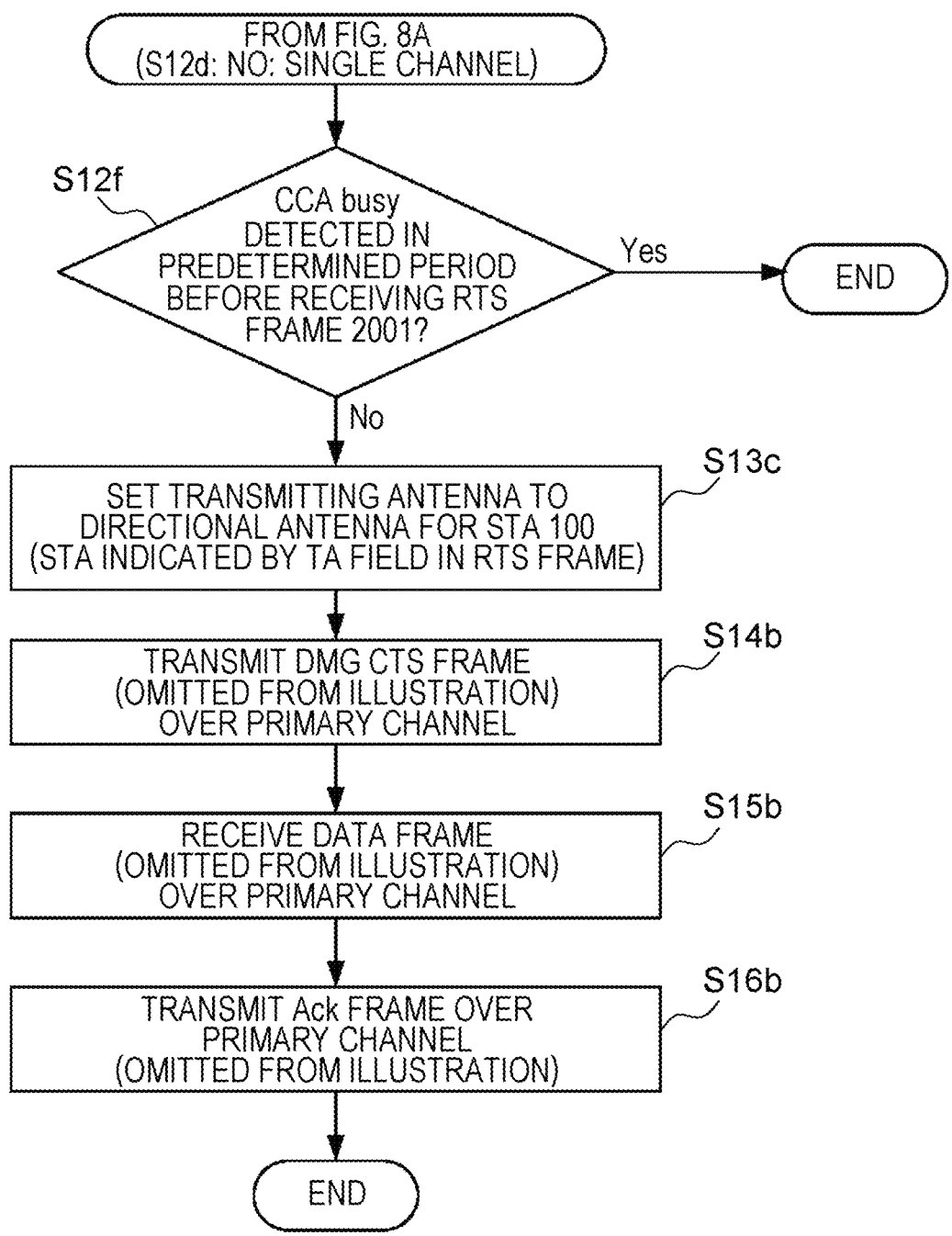
FIG. 8B is a flowchart illustrating an operation example of a STA according to a modification of the first embodiment.

Next, a modification of the first embodiment described above will be described with reference to FIGS. 8A and 8B. FIGS. 8A and 8B illustrate a modification of the example of operations of the STA 200 illustrated in FIGS. 7A and 7B. In the example of operations illustrated in FIGS. 8A and 8B, the operations in a case of the STA 200 receiving an RTS frame 2001 over a single channel differ from that in FIGS. 7A and 7B. For example, the determining processing S12*b* in FIG. 7A is omitted from FIG. 8A. Also, in FIG. 8B, processing S12*f* equivalent to the determining processing S12*b* in FIG. 7A is added to FIG. 7B.

Accordingly, in FIG. 8A, the STA 200 advances the processing to step S12*d* regardless of whether or not CCA busy has been detected in the PIFS before receiving the RTS frame 2001.

In step S12*d*, the STA 200 judges whether or not the RTS frame 2001 has been transmitted over multiple channels in the same way as with the processing 12*c* in FIG. 7A, and branches the processing in accordance with the results of the judgement. For example, in a case of having judged that the RTS frame 2001 has been transmitted over multiple channels (Yes in step S12*d*), processing equivalent to that in the processing of S13*a*, S13*b*, S14*a*, S15*a*, and S16*a*, described in FIG. 7A, may be executed by the STA 200. For example, the STA 200 performs carrier sensing regarding channels indicated by the value in the compressed BW field, decides channels for transmission of the CTS 2002, and receives a data frame 1003 over the channels where the CTS frame 2002 has been transmitted.

In steps S13*a* and S13*b*, the STA 200 performs carrier sensing with the receiving antenna set to directional antenna toward the STA 100, and thus can reduce the probability of CCA busy being detected due to interference waves from a different direction from the direction of the STA 100. Accordingly, in a case where the STA 200 is in an environment of receiving transmitted signals that are interference waves arriving from a direction that is different from the direction where the STA 100 is located, the probability of obtaining a transmission opportunity of the CTS frame 2002 can be increased. Thus, the reception opportunity of the STA 200 receiving data frames 1003 transmitted by the STA 100 increases, so the reception data throughput from the STA 100 improves.

On the other hand, in a case where judgement is made in step S12d in FIG. 8A that the RTS frame 2001 has been transmitted over a single channel (No), the STA 200 performs the processing exemplified in FIG. 8B. For example, the STA 200 determines whether or not CCA busy has been detected in the PIFS (e.g., 8 μs) before receiving the RTS frame 2001 (step S12f).

In a case where CCA busy is detected (Yes in step S12f), the single channel is busy, so the STA 200 may omit communication with the STA 100 and end the processing. In a case where CCA busy is not detected (No in step S12f), the STA 200 may perform processing equivalent to that in the processing of S13c, S14b, S15b, and S16b, described in FIG. 7A as exemplified in FIG. 8B.

For example, the STA 200 sets the transmitting antenna to directional antenna toward the STA 100, and transmits the CTS frame 2002 over the primary channel. Accordingly, the STA 200 receives a data frame 1003 from the STA 100 over the primary channel, and transmits an Ack frame 1004 or Block Ack frame to the STA 100 over the primary channel.

As described above, according to a modification of the first embodiment, the STA 200 performs operations in accordance with whether the RTS frame 2001 was transmitted by multiple channels or transmitted by a single channel, regardless of whether CCA busy has been detected on the primary channel or not. Accordingly, in a case where CCA busy of the primary cannel has been detected at the STA 200 due to interference waves arriving from a different direction from the direction where the STA 100 is located, the STA 200 does not end processing, unlike step S12b (Yes) in FIG. 7A. Thus, in a case where CCA busy has been detected on the primary channel, the STA 200 can continue processing, and communication started with the STA 100 using channels where CCA busy is not detected.

Now, a case where the value of the reserved bits of the RTS frame 2001 is "11" (binary) indicating "multi-channel", and the value of the compressed BW field is "0" indicating "single-channel" (see FIG. 5A), will be described. In this case, the STA 200 may make determination of "Yes" in step S12d in FIG. 8A, and the processing advanced to step S13a. The STA 200 may perform carrier sensing regarding single channel that the value of the compressed BW field indicates in step S13b.

As described above, according to the above-described modification, the STA 200 judges which of multi-channel or single-channel the received RTS frame 2001 has been transmitted by, and advances the processing in accordance with the results of the judgment, regardless of whether or not CCA busy is detected after receiving the RTS frame 2001. Accordingly, a situation can be avoided where data communication between the STA 100 and STA 200 is not started due to detection of CCA busy after having received the RTS frame 2001.

Second Embodiment

Figure 9:
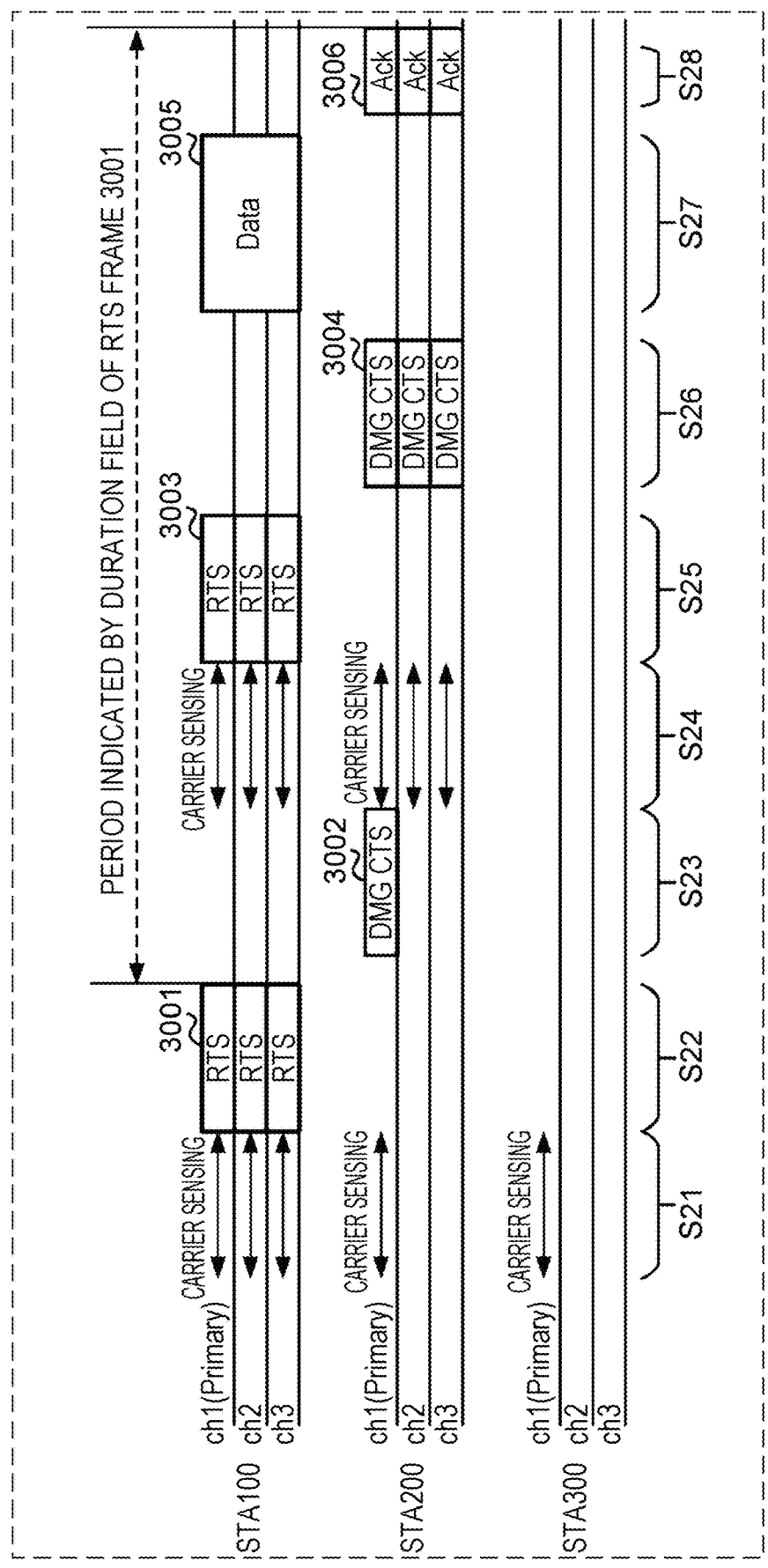
FIG. 9 is a diagram illustrating an example of data communication of a wireless communication system according to a second embodiment.
Figure 10:
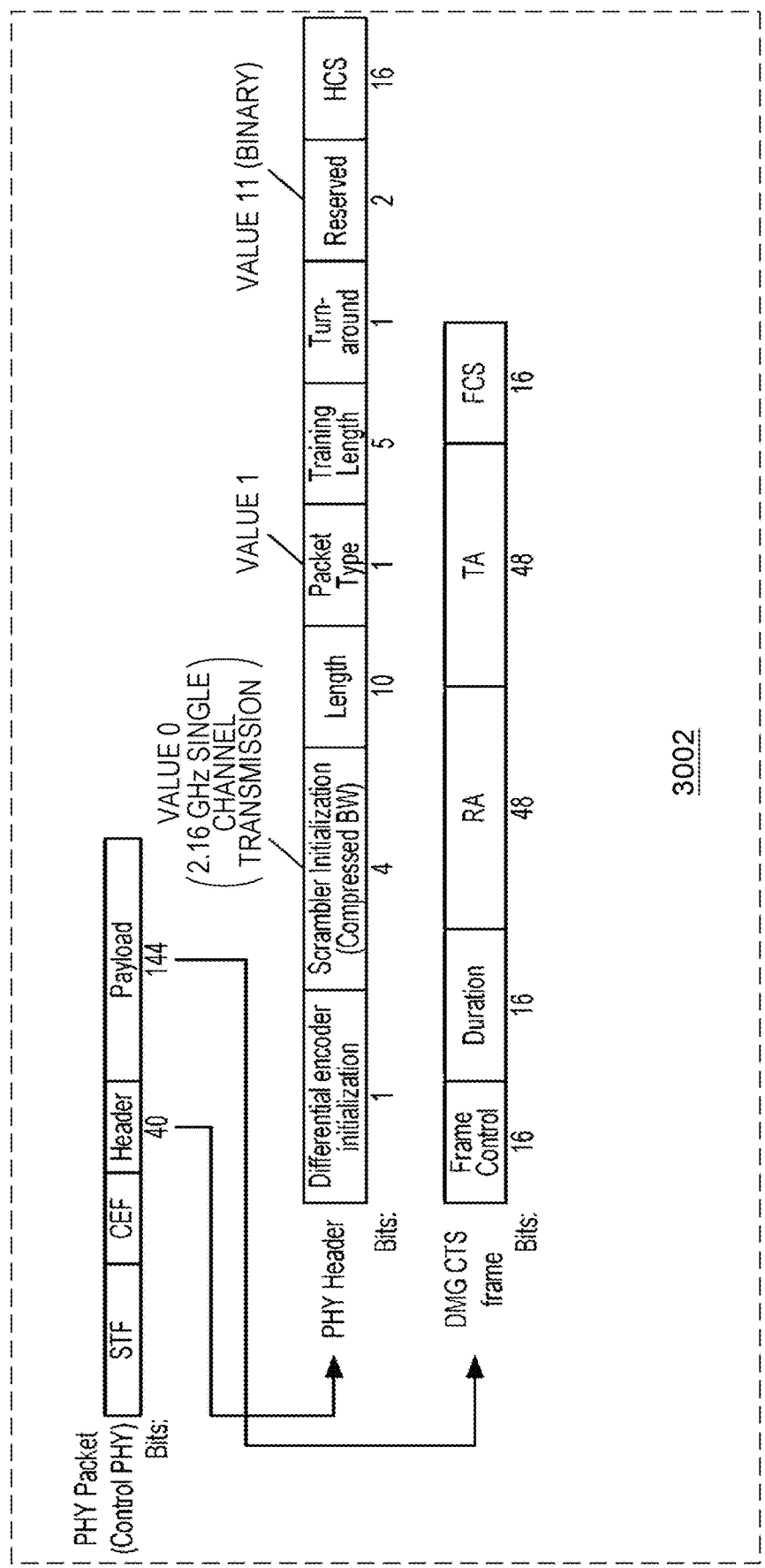
FIG. 10 is a diagram illustrating an example of a clear to send (CTS) frame format according to the second embodiment.
Figure 11A:
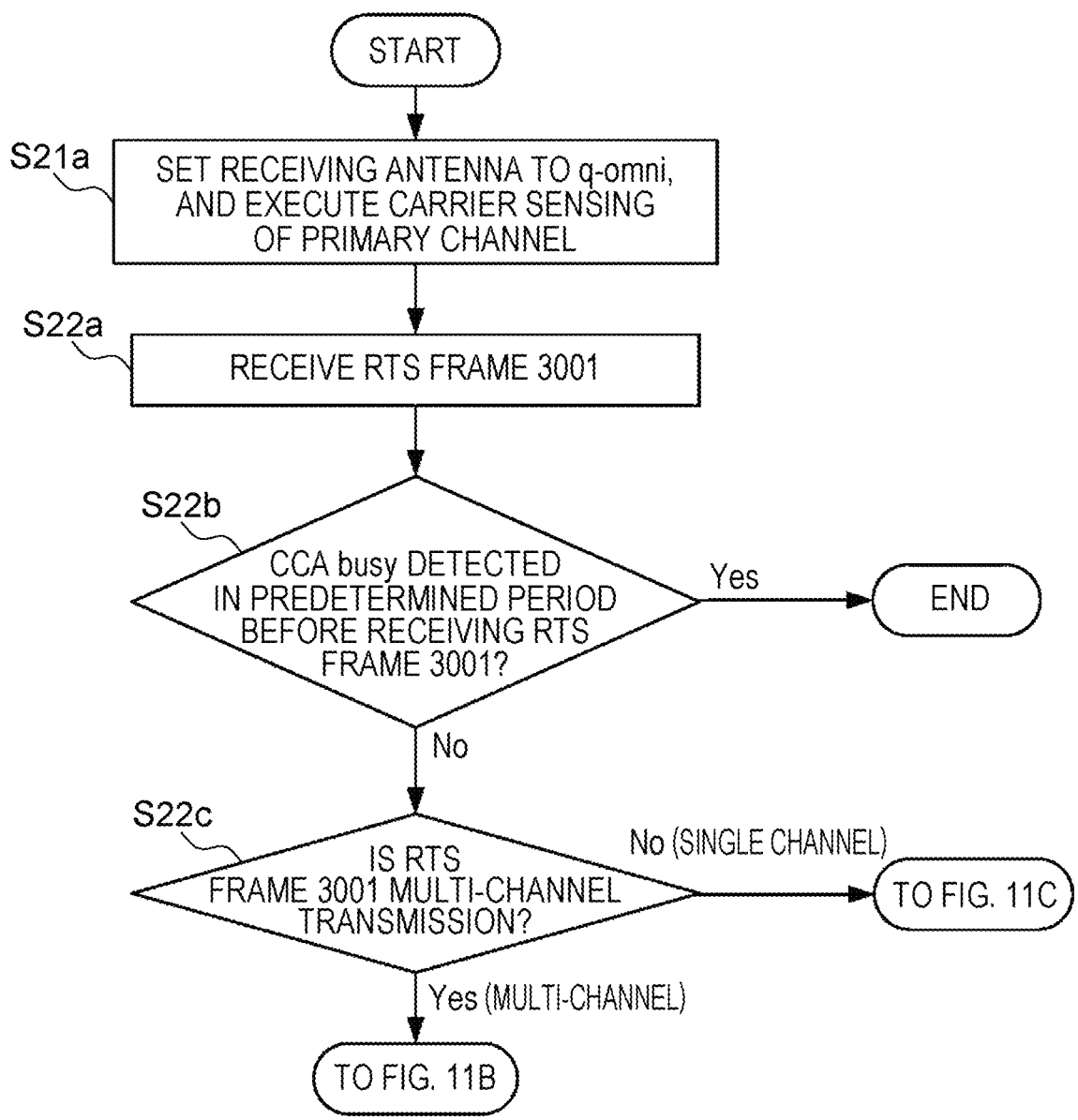
FIG. 11A is a flowchart illustrating an operation example of a STA according to the second embodiment.
Figure 11B:
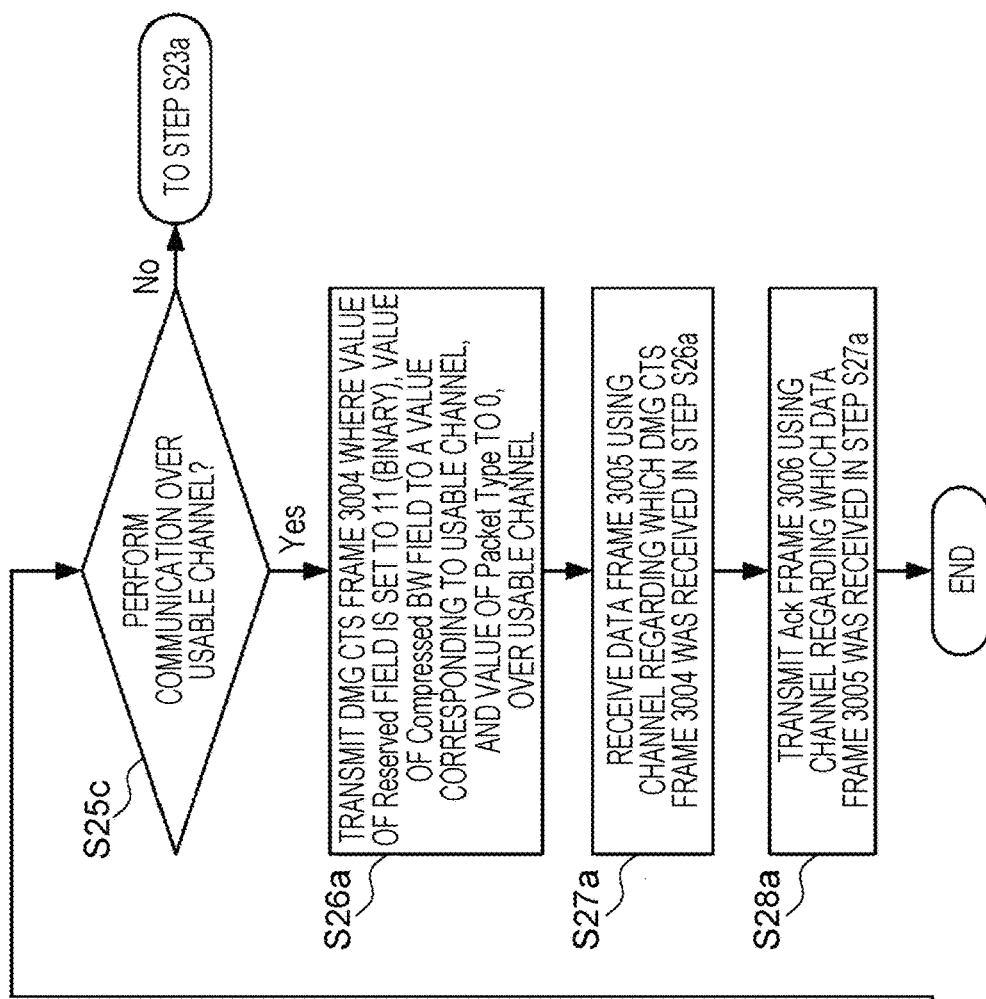
FIG. 11B is a flowchart illustrating an operation example of a STA according to the second embodiment.

Next, a second embodiment will be described with reference to FIGS. 9 through 11C. FIG. 9 is a diagram illustrating an example of data communication of a wireless communication system 1 according to the second embodiment. An operation example where the STA 100 and another STA 200 perform data communication is illustrated in FIG. 9, in the same way as with FIG. 3. FIG. 10 is a diagram illustrating a format example of a CTS frame 3002. FIGS. 11A through 11C are a flowchart illustrating an operation example of the STA 200 receiving data 3005.

Note that in the second embodiment, the STA 100, STA 200, and STA 300 may have the same or similar configurations as the configuration exemplified in FIGS. 6A and 6B according to the first embodiment. In other words, the configuration example of the "STA" exemplified in FIGS. 6A and 6B may be shared between the first and second embodiments.

Step S21

The STA 100 that transmits data 3005 performs carrier sensing of multiple channels (e.g., the three channels of ch1, ch2, and ch3) to be used for transmission of data frames, for example, as exemplified in FIG. 9. Also, the STA 200 (and STA 300) performs carrier sensing regarding part of the multiple channels (e.g., primary channel ch1).

Step S22

In a case where no CCA busy has been detected on the channels ch1, ch2, and ch3 in step S21, the STA 100 transmits an RTS frame 3001 addressed to the STA 200, over the channels ch1, ch2, and ch3. The STA 200 receives the RTS frame 3001 over one or more of the channels ch1, ch2, and ch3. This "one or more channels" means a state where the STA 200 is not correctly receiving the RTS frame 3001 on part of the multiple channels.

Step S23

In a case where CCA busy is not detected at the primary channel ch1, the STA 200 transmits a CTS frame 3002 over a single channel (e.g., primary channel ch1). FIG. 10 illustrates an example of the format of the DMG CTS frame 3002. Fields in the format illustrated in FIG. 10 that are the same as fields described in FIG. 4 will be omitted from description.

In step S23, the STA 200 sets the value of the reserved field to "11" (binary), the same as in FIG. 4, sets the value of the compressed BW field to "0" indicating single-channel transmission, and sets the value of packet type to "1". Note that in a case where the value of packet type of the DGM CTS frame 3002 is "0", the STA 200 may perform single-channel data transmission in the same way as in FIG. 7B. An operation example thereof will be described again later in FIG. 11C.

On the other hand, a DMG CTS frame 3002 regarding which the packet type value is set to "1" indicates a retransmission request for the RTS frame 3001. For example, in a case where the value of the reserved bits of the received RTS frame 3001 indicated "multi-channel" but reception of the RTS frame 3001 has failed on a part of the channels, the STA 200 requests the transmission source STA 100 for retransmission of the RTS frame 3001.

Step S24

After transmission of the CTS frame 3002, the STA 200 may perform carrier sensing regarding multiple channels (e.g., ch1, ch2, and ch3) that the compressed BW field of a correctly-received RTS frame 3001 indicates. During carrier sensing, the STA 200 may set the receiving antenna to directional antenna toward the STA (e.g., STA 100) that the TA field in the RTS frame 3001 indicates.

Note that settings may be made where, out of the multiple channels that the compressed BW field indicates, carrier sensing is not performed again on channels regarding which carrier sensing has already been performed (e.g., primary channel ch1). On the other hand, in a case of having received a CTS frame 3002 where "1" has been set to the packet type value, the STA 100 may perform carrier sensing regarding the multiple channels ch1, ch2, and ch3, before transmitting the an RTS frame 3003 regarding retransmission.

Carrier sensing may be performed during PIFS, for example. During carrier sensing, the STA 100 may set the transmitting antenna to directional antenna toward the STA (e.g., STA 200) that the TA field in the CTS frame 3002 indicates.

Step S25

In a case where CCA busy has not been detected in the multiple channels ch1, ch2, and ch3, the RTS frame 3003 may be transmitted (retransmitted) by the STA 100 over the multiple channels ch1, ch2, and ch3 following a time interval of PIFS or longer, for example.

Step S26

In a case of having received the RTS frame 3003 relating to retransmission in step S25, the STA 200 transmits a CTS frame 3004 over channels regarding which CCA busy was not detected in the carrier sensing in step S24 (e.g., ch1, ch2, and ch3). "0", for example, is set to the value for the packet type in this CTS frame 3004.

Step S27

In a case of having received the CTS frame 3004 over multiple channels ch1, ch2, and ch3, the STA 100 may transmit one or multiple data frames 3005 during a period indicated by the duration field of the RTS frame 3003.

Step S28

After having received the data frame 3005, e.g., after SIFS, the STA 200 may transmit an Ack frame 3006 or a Block Ack frame omitted from illustration, addressed to the STA 100. On the other hand, the STA 100 may stand by for the Ack frame 3006 or Block Ack frame during the period indicated by the duration field in the RTS frame 3003.

Next, an operation example between the above-described STA 100 and STA 200, from the perspective of the STA 200 that receives the data 3005, will be described with reference to the flowchart in FIGS. 11A through 11C.

Step S21*a*

The STA 200 sets the receiving antenna to quasi-omni-directionality (q-omni), for example, as exemplified in FIG. 11A. In other words, the STA 200 sets the reception RF circuit 114 so as to receive wireless signals using the receiving q-omni antenna 115. The STA 200 then performs carrier sensing of the primary channel using the receiving q-omni antenna 115.

Step S21*a* represents processing in the standby state of the STA 200. The STA 200 continues carrier sensing until receiving a packet (e.g., a packet of the RTS frame 3001) from another STA (e.g., STA 100), for example. In step S21*a*, the STA 200 performs carrier sensing for the primary channel ch1, and does not perform carrier sensing for the other channels ch2 and ch3, so electric power consumption while the STA 200 is in a standby state can be reduced.

Step S22*a*

The STA 200 receives the RTS frame 3001.

Yes in Step S22*b*

The STA 200 performs branching of the processing in accordance with the results of carrier sensing in step S21*a*. For example, judgment is made regarding whether or not CCA busy has been detected in the PIFS (e.g., 8 μs) before receiving the RTS frame 3001, and branching of the processing is performed in accordance with the results of the judgment.

For example, in a case of having detected CCA busy in the PIFS before receiving the RTS frame 3001 (Yes), the STA 200 may judge that interference waves arriving from another STA (e.g., STA 300) on the primary channel will be received, an end the processing. In this case, the STA 200 does not transmit the CTS frame 3002, in order to avoid subjecting the STA 300 to interference waves.

In a case where the received RTS frame 3001 requests multi-channel transmission, the STA 200 judges whether or not response by a CTS frame is permissible in accordance with the results of carrier sensing on the primary channel in the same way as with a terminal conforming to the 11ad standard. Accordingly, fairness of obtaining transmission opportunity can be maintained with other STAs including terminals conforming to the 11ad standard.

Note that in a case where CCA busy is detected in the PIFS before receiving the RTS frame 3001 in step S22*b*, and in a case where the RTS frame 3001 indicates multi-channel transmission, the STA 200 may advance the flow to step S22*c* without ending the processing.

The STA 200 performs carrier sensing again in later-described step S24*b*, so the probability of obtaining a communication opportunity with the STA 100 can be increased. Details will be described later with reference to FIGS. 11B and 11C.

No in Step S22*b*

In a case where CCA busy is not detected in the PIFS before receiving the RTS frame 3001 (No), the STA 200 may advance the flow to step S22*c*.

Step S22*c*

The STA 200 performs branching of processing in accordance with values included in the RTS frame 3001 received in step S22*a*. In other words, the STA 200 judges whether or not the RTS frame 3001 has been transmitted over multiple channels, and performs branching of processing in accordance with the results of the determination.

For example, in a case where the value of the reserved bits (see FIG. 10) of the RTS frame 3001 is not "11" (binary) (No), judgement is made that the RTS frame 3001 has been transmitted over a single channel. In this case, the STA 200 advances the processing to FIG. 11C. The processing of FIG. 11C will be described later.

On the other hand, in a case where the value of the reserved bits of the RTS frame 3001 is "11" (binary) (Yes) in step S22*c*, judgement is made that the RTS frame 3001 has been transmitted over multiple channels. In this case, the STA 200 advances the flow to FIG. 11B.

Step S23*a*

As exemplified in FIG. 11B, the STA 200 transmits a CTS frame 3002 requesting retransmission of the RTS frame 3001, for example, over a single channel (e.g., primary channel ch1). In the CTS frame 3002 requesting retransmission of the RTS frame 3001, for example, the value of the reserved field is set to "11" (binary), the value of the compressed BW field is set to "0", and the value of packet type is set to "1". Note that in a case of having received a CTS frame 3002 in which the value of packet type is "1", the STA 100 may perform carrier sensing for the channels over which the RTS frame 3003 regarding retransmission is to be transmitted, in order to retransmit the RTS frame 3001.

Step S24*a*

After transmission of the CTS frame 3002, the STA 200 may switch the receiving antenna to directional. For example, the STA 200 uses the MAC control unit 101 to set the reception RF circuit 114 in FIG. 6A so that reception (which may include carrier sensing) is performed using the receiving antenna array 116 in FIG. 6A.

The MAC control unit 101 also sets the reception RF circuit 114 and receiving antenna array 116 in FIG. 6A so that the directionality of the receiving antenna array 116 is directed toward the STA (e.g., STA 100) indicated in the TA field of the reception RTS frame 3001. In other words, the STA 200 sets the receiving antenna array 116 to directional antenna toward the STA 100.

Step S24b

The STA 200 performs carrier sensing regarding channels that the compressed BW field of the RTS frame 3001 indicates. For example, in the example in FIG. 9, the channels that the compressed BW field indicates are channels ch1, ch2, and ch3, so in step S24b the STA 200 performs carrier sensing regarding ch1, ch2, and ch3.

Step S25a

The STA 200 receives the RTS frame 3003 transmitted over channels ch1, ch2, and ch3 from the STA 100.

Step S25b

The STA 200 may decide usable channels based on the value of the compressed BW field in the received RTS frame 3001, and the results of carrier sensing in step S24b. For example, a channel indicated by the value in the compressed BW field, that has been the object of carrier sensing in step S24b, and that has not had CCA busy detected in the carrier sensing, may be decided to be a usable channel.

No in step S25c

Now, in a case where there is no usable channel, or in a case where the primary channel is not included in usable channels (No), the STA 200 returns to step S23a, for example, and repeats the processing of step S23 in FIG. 9 and thereafter.

Yes in Step S25c

On the other hand, in a case where there are one or more usable channels including the primary channel (Yes), the STA 200 executes step S26a, for example. Note that in a case where the STA 100 and STA 200 support communication not including a primary channel, and the primary channel is not included in the usable channels, the STA 200 may make a determination of "Yes" in step S25c and advance the processing to step S26a.

Whether or not communication not including a primary channel is supported may be notified to the communication partner using an enhanced directional multi-gigabit (EDMG) capabilities element, for example. For example, information of whether or not communication not using a primary channel is supported may be included in a probe response frame transmitted to a transmission source of a probe request frame. A probe request frame is used to search or scan with a communication partner that a certain STA can access. Note that the processing shown below in steps S26a, S27a, and S28a may be the same as that in steps S14a, S15a, and S16a, each illustrated in FIG. 7A.

Step S26a

The STA 200 transmits the CTS frame 3004 over usable channels. In the example illustrated in FIG. 9, the CTS frame 3004 is transmitted from the STA 200 to the STA 100 over the three usable channels ch1, ch2, and ch3, including the primary channel. In the CTS frame 3004, for example, the value of the reserved field is set to "11" (binary), the value of the compressed BW field is set to a value corresponding to the usable channels, and the value of packet type is set to "0". In a case of having received the CTS frame 3004, the STA 100 transmits a data frame 3005 to the STA 200 over usable channels in accordance with the value of the compressed BW field.

Step S27a

The STA 200 receives the data frame 3005 that the STA 100 has transmitted, over the channels where the CTS frame 3004 was transmitted. In FIG. 9, the CTS frame 3004 was transmitted over channels ch1, ch2, and ch3, so the STA 200 receives the data frame 3005 over the channels ch1, ch2, and ch3.

Step S28a

The STA 200 may transmit to the STA 100 an Ack frame 3006 or Block Ack frame omitted from illustration, after SIFS following reception of the data frame 3005 ending.

Note that in step S26a, the STA 200 may set the transmitting antenna to a directional antenna in accordance with the usable channels, before transmitting the CTS frame 3004. In other words, the STA 200 may set different directionality patterns in accordance with the channels being used.

Also, the STA 200 may in step S24a standby with the receiving q-omni antenna 115, without setting the receiving antenna to directional antenna. In this case, the STA 200 may set the receiving antenna to directional antenna in step S26a before transmitting the CTS frame 3004.

The STA 200 may repeat reception of data frames (step S27a) and transmission of Ack frames (step S28a) during a period in accordance with the duration field value indicated in the retransmitted RTS frame 3003.

In a case where data communication with the STA 100 has been completed, in other words, in a case where the period indicated by the duration field has ended, the STA 200 may return the processing to the start in FIG. 11A, or may return the processing to step S24b in FIG. 11B.

The STA 200 may perform carrier sensing by the receiving q-omni antenna 115 in step S24b. In this case, the processing of steps S21 through S23 in FIG. 9 can be omitted at the time of performing communication with the STA 100 or other STAs using multiple channels, so the delay until data frame reception can be reduced.

Further, in a case where the STA 200 is not going to perform communication using multiple channels with the STA 100 or other STAs, the STA 200 goes to a single-channel standby state by returning the processing to the start in FIG. 11A. Accordingly, the electric power consumption of the STA 200 can be reduced.

Next, an example of operations in a case where determination of "No" has been made by the STA 200 in step S22c in FIG. 11A, i.e., a case where the RTS frame 3001 received in step S22 in FIG. 9 has been determined to have been transmitted over a single channel, will be described with reference to FIG. 11C. Step S23c In a case where determination has been made that the received RTS frame 3001 has been transmitted over a single channel, the STA 200 may set the transmitting antenna to directional antenna toward the STA (e.g., STA 100) that the TA field in the received RTS frame 3001 indicates.

Step S23d

The STA 200 transmits the CTS frame 3002 requesting retransmission of the RTS frame 3001 over a single channel (e.g., the primary channel ch1), for example. In this CTS frame 3002, the value of the reserved field is set to "11" (binary), the value of the compressed BW field is set to "0", and the value of packet type is set to "1".

In a case where reception of the CTS frame 3002 has ended, the STA 100 may start transmission of a data frame after SIFS, for example, over a channel in accordance with the value of the compressed BW field in the CTS frame 3002. For example, the STA 100 may transmit the data frame over the primary channel ch1.

In other words, in a case where reception of the CTS frame 3002 has ended, the STA 100 may transmit the data frame after SIFS following reception of the CTS frame 3002 ending, in the same way as in step S15 in FIG. 3. That is to say, the STA 100 may start transmission of the data frame without performing retransmission of the RTS frame 3003 (and accordingly without performing carrier sensing). This means that the STA 100 starts single-channel data communication to the STA 200, handling the CTS frame 3002 in step S23 in FIG. 9 as being equivalent to the CTS frame 2002 in step S14 in FIG. 3.

Step S27*c*

The STA 200 stands by for reception of the data frame over the single channel (e.g., primary channel ch1) where the CTS frame 3002 was transmitted, and receives the data frame that the STA 100 transmits over the single channel ch1.

Step S28*c*

The STA 200 may transmit an Ack frame or Block Ack frame to the STA 100 after reception of the data frame (e.g., after standby for SIFS). The STA 100 may stand by to receive the Ack frame or Block Ack frame in the period that the duration field of the RTS frame 3001 indicates.

As described above, after having transmitted the CTS frame including information requesting retransmission of the RTS frame, the STA 200 does not perform carrier sensing for part of the multiple channels. Accordingly, the electric power consumption of the STA 200 can be reduced as compared to a case of performing carrier sensing regarding all of the multiple channels in standby state.

Also, the STA 200 performs carrier sensing using a directional antenna to the STA 100 in step S24 in FIG. 9, for example, and accordingly can reduce the probability of detecting CCA busy due to transmitted signals arriving from a direction different from that of the STA 100 (e.g., STA 300). Accordingly, in a case where the STA 200 is in an environment of receiving transmitted signals arriving from the STA 300 that is different from that of the STA 100 that is the communication partner, the probability of obtaining a transmission opportunity with the STA 100 can be increased. Thus, the reception throughput of the STA 200 can be improved.

Also, the STA 100 can reduce the probability of detection of CCA busy due to transmission signals arriving from a direction (e.g., STA 300) that is different from the STA 200 by performing carrier sensing using the directional antenna 116 in step S13. Accordingly, in a case where the STA 100 is in an environment of receiving transmitted signals arriving from the STA 300 that is different from the of the STA 200 that is the communication partner, the probability of obtaining a transmission opportunity with the STA 200 can be increased. Thus, the transmission throughput of the STA 100 can be improved.

Summarization of Advantages of First and Second Embodiments

As described above, according to the above-described embodiments, the STA 200 that receives data performs first carrier sensing with regard to not all of multiple channels but a part thereof, before receiving an RTS frame. Accordingly, the electric power consumption of the STA 200 in a standby state due to carrier sensing can be reduced.

Also, after receiving the RTS frame, the STA 200 performs second carrier sensing regarding at least one channel where the first carrier sensing has not been performed, before a data frame is received (e.g., before transmission of a CTS frame). Accordingly, the probability that the CRT frame that the STA 200 has transmitted will collide with signals transmitted by another STA that is different from the STA 100 that is the communication party can be reduced.

Also, including the primary channel in the object of the first carrier sensing, for example, facilitates guaranteeing fairness in obtaining transmission opportunity among the STAs in a case where the number of transmission channels (in other words, transmission bandwidth) of data frames is adaptively changed for each STA. Alternatively, if there are differences in supported wireless LAN standards among the STAs, guaranteeing fairness in obtaining transmission opportunity among the STAs is facilitated.

Also, applying reception beamforming having directionality to the transmission source of the RTS frame in the second carrier sensing enables the probability of a busy state being detected at the STA 200 due to interference waves from frames that other STAs transmit or receive to be reduced.

The STA 200 sets channels where a busy state is not detected to be used for transmitting the CTS frame, so the probability of obtaining a transmission opportunity for the CTS frame can be increased.

The STA 200 can also increase the probability of the CTS frame arriving at the STA 100, by applying transmission beamforming, having directionality to the STA 100 that is the transmission source of the data frame, in transmission of the CTS frame. Accordingly, the probability of the STA 100 being able to obtain a transmission opportunity of the data frame to the STA 200 can be increased. On the other hand, the STA 200 can increase the probability of successful reception of the data frame by setting the channel where the CTS frame was transmitted to the STA 100 as the channel used for reception of the data frame.

Note that in a case where a busy state is detected in the first carrier sensing, the STA 200 may set channels where a busy state has not been detected in the second carrier sensing may be set as the channels to be used for transmitting the CTS frame. According to these settings, a situation where subsequent communication with the STA 100 is not continued due to the busy state detection in the first carrier sensing. Accordingly, the probability of being able to start data communication between the STA 100 and the STA 200 can be improved.

Also, in a case where single-channel transmission is indicated in the received RTS frame, and a busy state is not detected in the first carrier sensing, the primary channel may be set to the channel used for transmission of the CTS frame. These settings facilitate securing data communication opportunity using the single channel between the STA 100 and STA 200.

Also, in a case where the RTS frame is not received at part of the multiple channels, second carrier sensing may be performed by the STA 200 on all channels after having transmitted a CTS frame including information requesting retransmission of the RTS frame to the STA 100. Accordingly, the probability of successful reception of the RTS frame retransmitted from the STA 100 can be improved at the STA 200.

Also, the STA 200 may apply reception beamforming having directionality as to the STA 100, in the second carrier sensing performed after transmission of the CTS frame indicating a retransmission request. Accordingly, in a case of an environment of receiving interference due to frames being transmitted/received by other STAs, the probability of obtaining a transmission opportunity for the retransmission request to the STA 100 can be increased. Accordingly, the probability of successful reception of the RTS frame retransmitted from the STA 100 can be improved.

Also, the STA 200 may set, out of the multiple channels indicated in the retransmitted RTS frame, channels where a busy state is not detected in the second carrier sensing performed after the retransmission request, as being the channels usable for reception of the data frame. According to these settings, the STA 200 can successfully obtain a data communication opportunity with the STA 100 in a case where there is a retransmission request for the RTS frame.

The functional blocks such as used in the above-described embodiments typically are realized as large scale integration (LSI) device that is an integrated circuit. These may be individually formed into one chip, or part or all may be included in one chip. While description has been made here regarding an LSI, there are different names such as integrated circuit (IC), system LSI, super LSI, and ultra LSI, depending on the degree of integration.

The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology and so forth is a possibility.

Summarization of Present Disclosure

A wireless communication device according to the present disclosure includes: a reception circuit that receives a first signal requesting a transmission permission for data signals and including channel information used for data transmission; a transmission circuit that transmits a second signal to a transmission source of the first signal, in a case of permitting transmission of the data signals with regard to reception of the first signal; and a control circuit that outputs a first control signal to the reception circuit in order to execute first carrier sensing regarding part of a plurality of channels that are candidates for reception of the first signal, before reception of the first signal, and after having received the first signal, outputs a second control signal to the reception circuit in order to execute second carrier sensing regarding one or more channels, out of the plurality of channels, that are one or more channels corresponding to the channel information included in the first signal, and where at least the first carrier sensing has not been executed, before reception of the data signals by transmission of the second signal.

In the wireless communication device according the present disclosure, the second carrier sensing is performed after reception of the first signal and before transmission of the second signal.

In the wireless communication device according the present disclosure, the second carrier sensing is performed regarding the plurality of channels including the part of channels regarding which the first carrier sensing has been executed.

In the wireless communication device according the present disclosure, the plurality of channels include a primary channel and secondary channel, and the part of channels where the first carrier sensing is performed include the primary channel.

In the wireless communication device according the present disclosure, the control circuit outputs a third control signal to the reception circuit in order to apply reception beamforming, having directionality as to the transmission source of the first signal, in the second carrier sensing.

In the wireless communication device according the present disclosure, the control circuit sets, out of the plurality of channels, channels where a busy state is not detected in the second carrier sensing, as channels to be used for transmission of the second signal.

In the wireless communication device according the present disclosure, the control circuit outputs a fourth control signal to the transmission circuit, in order to apply transmission beamforming, having directionality as to the transmission source of the first signal, in transmission of the second signal.

In the wireless communication device according the present disclosure, the control circuit sets, channels where the second signal was transmitted, out of the plurality of channels, as channels to be used for reception of the data signals.

In the wireless communication device according the present disclosure, the control circuit, in a case where a busy state is detected in the first carrier sensing, sets channels where a busy state is not detected in the second carrier sensing, as channels to be used for transmission of the second signal.

In the wireless communication device according the present disclosure, the plurality of channels include a primary channel and secondary channel, and the control circuit sets the primary channel as the channel to be used for transmission of the second signal, in a case where the received first signal indicates that a single channel out of the plurality of channels is to be used for transmission of the data signals, and a busy state is not detected regarding the plurality of channels in the first carrier sensing.

In the wireless communication device according the present disclosure, the transmission circuit transmits the second signal including information requesting retransmission of the first signal to the transmission source of the first signal, in a case where the first signal is not received at a part of the plurality of channels, and the control circuit outputs the second control signal to the reception circuit, in order to execute the second carrier sensing regarding all of the plurality of channels, after transmission of the second signal including the information requesting retransmission.

In the wireless communication device according the present disclosure, the control circuit outputs the third control signal to the reception circuit, in order to apply reception beamforming having directionality as to the transmission source of the first signal, in the second carrier sensing performed after transmission of the second signal including the information requesting retransmission.

In the wireless communication device according the present disclosure, the reception circuit receives the first signal retransmitted in accordance with the request for retransmission, and the control circuit sets, as channels usable for reception of the data signals, channels where a busy state is not detected in the second carrier sensing performed after transmission of the second signal including the information requesting retransmission, out of the plurality of channels indicated in the retransmitted first signal.

A wireless communication method according to the present disclosure includes: a second wireless communication device that receives data signals transmitted by a first wireless communication device performing a first carrier sensing, regarding part of a plurality of channels that are candidates for receiving a first signal requesting a transmission permission for the data signals and including channel information used for data transmission before reception of the first signal; the first wireless communication device transmitting the first signal to the second wireless communication device; the second wireless communication device transmitting a second signal to the first wireless communication device in a case of permitting transmission of the data signals with regard to reception of the first signal, and performing, after having received the first signal, second carrier sensing regarding one or more channels, out of the plurality of channels, that are one or more channels corresponding to the channel information included in the first signal, and where at least the first carrier sensing has not been executed, before reception of the data signals by transmission of the second signal.

The present disclosure is applicable to a wireless communication system where communication is performed following a wireless LAN related standard, for example.

What is claimed is:

1. A wireless communication device, comprising:
a reception circuit that
performs first carrier sensing on one of a plurality of channels,
receives a Request to Send (RTS) signal from another communication device, the RTS signal requesting a permission to transmit a data frame and the RTS signal including channel information indicating channels to be used for transmission of the data frame, and
performs second carrier sensing on the channels indicated by the channel information included in the received RTS signal;
a transmission circuit that transmits a Clear To Send (CTS) signal to the other communication device, the CTS signal permitting the other communication device to transmit the data frame,
wherein the reception circuit receives the data frame from the other communication device after the CTS signal is transmitted,
wherein the transmission circuit transmits the CTS signal including information requesting retransmission of the RTS signal to the other communication device, responsive to the RTS signal not received in a part of the plurality of channels; and
a control circuit which, after transmission of the CTS signal including the information requesting retransmission, outputs a second control signal to the reception circuit, in order to execute the second carrier sensing on all of the plurality of channels.

2. The wireless communication device according to claim 1,
wherein the second carrier sensing is performed after reception of the RTS signal and before transmission of the CTS signal.

3. The wireless communication device according to claim 1,
wherein the second carrier sensing is performed also on the channel on which the first carrier sensing has been executed.

4. The wireless communication device according to claim 1,
wherein the plurality of channels include a primary channel and secondary channel,
and wherein the channel on which the first carrier sensing is performed is the primary channel.

5. The wireless communication device according to claim 1, wherein
the control circuit, in operation,
outputs a first control signal to the reception circuit in order to perform the first carrier sensing with a quasi-omni pattern; and
outputs a second control signal to the reception circuit in order to perform the second carrier sensing with a reception directionality to the other communication device that transmits the RTS signal.

6. The wireless communication device according to claim 1, wherein
the control circuit, in operation, determines, out of the channels indicated by the channel information, channels where a busy state is not detected during the second carrier sensing, as channels to be used for transmission of the CTS signal.

7. The wireless communication device according to claim 1, wherein
the control circuit, in operation, outputs a control signal to the transmission circuit, in order to apply transmission beamforming, having directionality as to the other communication device that transmits the RTS signal, in transmission of the CTS signal.

8. The wireless communication device according to claim 1, wherein
the control circuit, in operation, determines a channel on which to transmit the CTS signal out of the channels indicated by the channel information.

9. The wireless communication device according to claim 1, wherein
the control circuit, in operation, sets channels where a busy state is not detected during the second carrier sensing, as channels to be used for transmission of the CTS signal.

10. The wireless communication device according to claim 1,
wherein the plurality of channels include a primary channel and secondary channel,
and wherein the control circuit, in operation, sets the primary channel as the channel to be used for transmission of the CTS signal, responsive to the received RTS signal indicating that a single channel is to be used for transmission of the data frame, and responsive to a busy state not detected in the first carrier sensing.

11. The wireless communication device according to claim 1,
wherein the control circuit outputs a control signal to the reception circuit, in order to apply reception beamforming having directionality as to the other communication device that transmits the RTS signal, during the second carrier sensing performed after transmission of the CTS signal including the information requesting retransmission.

12. The wireless communication device according to claim 1,
wherein the reception circuit receives the RTS signal retransmitted in accordance with the request for retransmission,
and wherein the control circuit sets, as channels usable for reception of the data frame, channels where a busy state is not detected during the second carrier sensing performed after transmission of the CTS signal including the information requesting retransmission, out of the channels indicated by the channel information included in the retransmitted RTS signal.

13. The communication device according to claim 1, wherein the second carrier sensing is performed on a subset of the plurality of channels, excluding the channel on which the first carrier sensing has been performed.

14. A wireless communication method performed by a wireless communication device, the wireless communication method comprising:
performing first carrier sensing on one of a plurality of channels;
receiving a Request to Send (RTS) signal from another communication device, the RTS signal requesting permission to transmit a data frame and the RTS signal including channel information indicating channels to be used for transmission of the data frame;

performing second carrier sensing on the channels indicated by the channel information included in the received RTS signal;

transmitting a Clear To Send (CTS) signal to the other communication device, the CTS signal permitting the other communication device to transmit the data frame; and receiving the data frame from the other communication device after the CTS signal is transmitted, transmitting the CTS signal including information requesting retransmission of the RTS signal to the other communication device, responsive to the RTS signal not received in a part of the plurality of channels; and after transmission of the CTS signal including the information requesting retransmission, outputting a second control signal to the reception circuit, in order to execute the second carrier sensing on all of the plurality of channels.

15. The wireless communication method according to claim 14, wherein the second carrier sensing is performed on a subset of the plurality of channels, excluding the channel on which the first carrier sensing has been performed.

* * * * *